United States Patent
Feng et al.

(10) Patent No.: US 12,175,323 B2
(45) Date of Patent: Dec. 24, 2024

(54) CAMERA READER APPARATUSES AND METHODS OF USING THE SAME

(71) Applicant: Hand Held Products, Inc., Charlotte, NC (US)

(72) Inventors: Chen Feng, Snohomish, WA (US); Patrick A. Giordano, Glassboro, NJ (US); Tao Xian, Mount Laurel, NJ (US); Eric A. Youngblood, Matthews, NC (US)

(73) Assignee: Hand Held Products, Inc., Charlotte, NC (US)

( * ) Notice: Subject to any disclaimer, the term of this patent is extended or adjusted under 35 U.S.C. 154(b) by 20 days.

(21) Appl. No.: 17/655,065

(22) Filed: Mar. 16, 2022

(65) Prior Publication Data

US 2023/0297794 A1    Sep. 21, 2023

(51) Int. Cl.
*G06K 7/10* (2006.01)

(52) U.S. Cl.
CPC ..... *G06K 7/10831* (2013.01); *G06K 7/10732* (2013.01); *G06K 7/10742* (2013.01)

(58) Field of Classification Search
CPC .................................................. G06K 7/10831
USPC .................................................... 235/462.42
See application file for complete search history.

(56) References Cited

U.S. PATENT DOCUMENTS

| | | |
|---|---|---|
| 10,740,581 B2 | 8/2020 | Barkan et al. |
| 11,003,875 B2 | 5/2021 | Dorado et al. |
| 2007/0181692 A1 | 8/2007 | Barkan et al. |
| 2012/0168509 A1* | 7/2012 | Nunnink ............ G06K 7/10732 235/455 |
| 2016/0241793 A1 | 8/2016 | Ravirala et al. |
| 2019/0228195 A1 | 7/2019 | Lozano et al. |

(Continued)

FOREIGN PATENT DOCUMENTS

| | | |
|---|---|---|
| CN | 107211093 B | 2/2020 |
| EP | 3499404 A2 | 6/2019 |
| EP | 3647989 A1 | 5/2020 |

OTHER PUBLICATIONS

Extended European Search Report and Search Opinion Mailed on Jul. 17, 2023 for EP Application No. 23158574, 9 page(s).

(Continued)

*Primary Examiner* — Rafferty D Kelly
(74) *Attorney, Agent, or Firm* — Alston & Bird LLP

(57) ABSTRACT

Embodiments of the disclosure provide improved multi-imager readers/scanners for reading codes utilizing a plurality of illuminators associated with various illumination types. Some embodiments include a ring of illuminators including a plurality of polarized illuminator assemblies, a plurality of narrow field illuminator assemblies, and a plurality of dark field illuminator assemblies, and additionally include a diffuser illuminator assembly. Utilizing these combination of illuminators, fields of view may be illuminated in a myriad of ways to increase the likelihood that a captured representation of the illuminated field via one or more imager results in a successful scanning operation. Some embodiments utilize data, such as previous data or data derived from current attempted reading of captured image representations, to determine illuminators to be activated to increase the likelihood of successfully completing a scanning operation.

22 Claims, 12 Drawing Sheets

(56) References Cited

U.S. PATENT DOCUMENTS

2020/0143129 A1* 5/2020 Dorado .............. G06K 7/10742
2020/0410181 A1* 12/2020 Rodriguez Ortiz .. G06K 7/1417

OTHER PUBLICATIONS

Intention to grant Mailed on Sep. 27, 2024 for EP Application No. 23158574, 9 page(s).

* cited by examiner

CAMERA READER APPARATUSES AND METHODS OF USING THE SAME

TECHNOLOGICAL FIELD

Embodiments of the present disclosure relate to improved apparatuses for accurately performing scanning operations and methods of using the improved apparatuses.

BACKGROUND

Readers (e.g., code scanners) often face various difficulties that impact the ability of such readers to successfully complete code reading operations. Such problems are worsened in certain contexts, such as where the reader is to be utilized for reading various types of codes on different materials, and/or otherwise perform in various circumstances.

Applicant has discovered problems with current reader implementations. Through applied effort, ingenuity, and innovation, Applicant has solved many of these identified problems by developing embodied in the present disclosure, which are described in detail below.

BRIEF SUMMARY

In one aspect, an apparatus includes a chassis, a ring illuminator assembly includes at least one of at least one polarized illuminator assembly, at least one dark field illuminator assembly, and/or at least one narrow field illuminator assembly, a diffuser assembly positioned behind the ring illuminator assembly, the diffuser assembly includes a diffuser and a diffuser back light reflector, where the diffuser back light reflector is positioned to direct light into the diffuser, at least one back light illumination board, the at least one back light illumination board includes at least one diffuser illuminator aligned with the diffuser back light reflector, a lens assembly includes an aimer lens and at least one imager lens, an aimer illuminator associated with the aimer lens, and at least one imager board includes at least one image sensor aligned with the at least one image lens, for example a narrow field sensor aligned with the narrow field lens and a wide field sensor aligned with the wide field lens, where the chassis houses the ring illuminator assembly, the diffuser illuminator, the at least one back light illumination board, the lens assembly, the aimer illuminator, and the at least one imager board.

The apparatus may also include where the apparatus includes a plurality of aimer folding reflectors, where the plurality of aimer folding reflectors includes a first aimer folding reflectors positioned in alignment with the aimer illuminator and that folds an aimer illumination towards a viewing axis of the apparatus, and a second aimer folding reflectors positioned to fold the aimer illumination in a near-coaxial direction associated with a narrow field of view associated with a narrow field sensor and a wide field of view associated with a wide field sensor.

The apparatus may also include where the diffuser includes a dome diffuser.

The apparatus may also include where the lens assembly includes a single piece lens holder that positions the aimer lens, a narrow field lens, and a wide field lens.

The apparatus may also include where the lens assembly includes a single optical lens and at least one polarizer, the at least one polarizer aligned with at least one polarized illuminator of the at least one polarized illuminator assembly.

The apparatus may also include where the ring illuminator assembly includes a pair of polarized illuminator assemblies and a pair of narrow field illuminators, each polarized illuminator assembly of the pair of polarized illuminator assemblies positioned at opposite positions across a defined axis.

The apparatus may also include where the diffuser illuminator is positioned centrally to the ring illuminator assembly.

The apparatus may also include the apparatus further includes a polarizer holder that positions at least one polarizer in front of a ring lens of the ring illuminator assembly aligned with at least one polarized illuminator associated with the at least one polarized illuminator assembly.

The apparatus may have the at least one image sensor including a wide field sensor and a narrow field sensor, and also include where the wide field sensor and the narrow field sensor are vertically aligned.

The apparatus may also have the at least one image sensor including a wide field sensor and a narrow field sensor, and also include where the wide field sensor and the narrow field sensor are horizontally aligned.

The apparatus may also include where the aimer illuminator is positioned laterally next to a wide field sensor of the at least one image sensor and a narrow field sensor of the at least one image sensor.

The apparatus may also include where the at least one image sensor includes a wide field sensor and a narrow field sensor, and where the aimer illuminator is positioned between the wide field sensor and the narrow field sensor.

The apparatus may also include the apparatus further includes an analyzer positioned at a back of the diffuser.

The apparatus may also include the apparatus further includes a protective window at a back of the diffuser.

The apparatus may also include where the at least one back light illumination board includes a single back light illumination board.

The apparatus may also include where the at least one imager board includes a single imager board.

The apparatus may also include the apparatus further includes an angled handle.

The apparatus may also include where the ring illuminator assembly defines a top side, a left side, a right side, and a bottom side, and where the ring illuminator assembly includes a first polarized illuminator assembly positioned in a top-left corner of the top side and the left side, and a second polarized illuminator assembly positioned in a top-right corner of the top side and the right side, a first narrow field illuminator positioned in a bottom-left corner of the bottom side and the left side, and a second narrow field illuminator positioned in a bottom-right corner of the bottom side and the right side, and a plurality of dark field illuminators, the plurality of dark field illuminators includes a dark field illuminator positioned along each of the top side, the left side, the bottom side, and the right side.

The apparatus may also include where the ring illuminator assembly is positioned in front of the diffuser illuminator, where the diffuser illuminator is positioned in front of the at least one back light illumination board, where the at least one back light illumination board is positioned in front of the lens assembly, and where the lens assembly is positioned in front of the at least one imager board.

The apparatus may also include the apparatus further includes at least one processor in communication with the narrow field sensor and/or the wide field sensor. Other technical features may be readily apparent to one skilled in the art from the following figures, descriptions, and claims.

In one aspect, a computer-implemented method includes activating, via a reader, at least one first illuminator of a ring illuminator assembly, the ring illuminator assembly including at least one of a polarized illuminator assembly, a diffuser assembly, a narrow field illuminator assembly, and/or a dark field illuminator assembly, capturing, via at least one imager, a first image, determining a first image effect represented in the first image by processing the first image, determining, based at least in part on the first image effect, a second at least one illuminators to activate, where the second at least one illuminators includes a combination of the polarized illuminator assembly, the diffuse illuminator, the narrow field illuminator, and the near field illuminator, activating the second at least one illuminators, and capturing, via the at least one imager, at least a second image.

In one aspect, a computer program product includes at least one non-transitory computer-readable storage medium having computer program code stored thereon, where the computer program code in execution with at least one processor configures the computer program product for activating, via a reader, at least one first illuminator of a ring illuminator assembly, the ring illuminator assembly including a polarized illuminator assembly, a diffuser assembly, a narrow field illuminator assembly, and/or a dark field illuminator assembly, capturing, via at least one imager, a first image, determining a first image effect represented in the first image by processing the first image, determining, based at least in part on the first image effect, a second at least one illuminator to activate, where the second at least one illuminators includes a combination of the polarized illuminator assembly, the diffuser assembly, the narrow field illuminator assembly, and the dark field illuminator assembly, activating the second at least one illuminator, and capturing, via the at least one imager, at least a second image.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
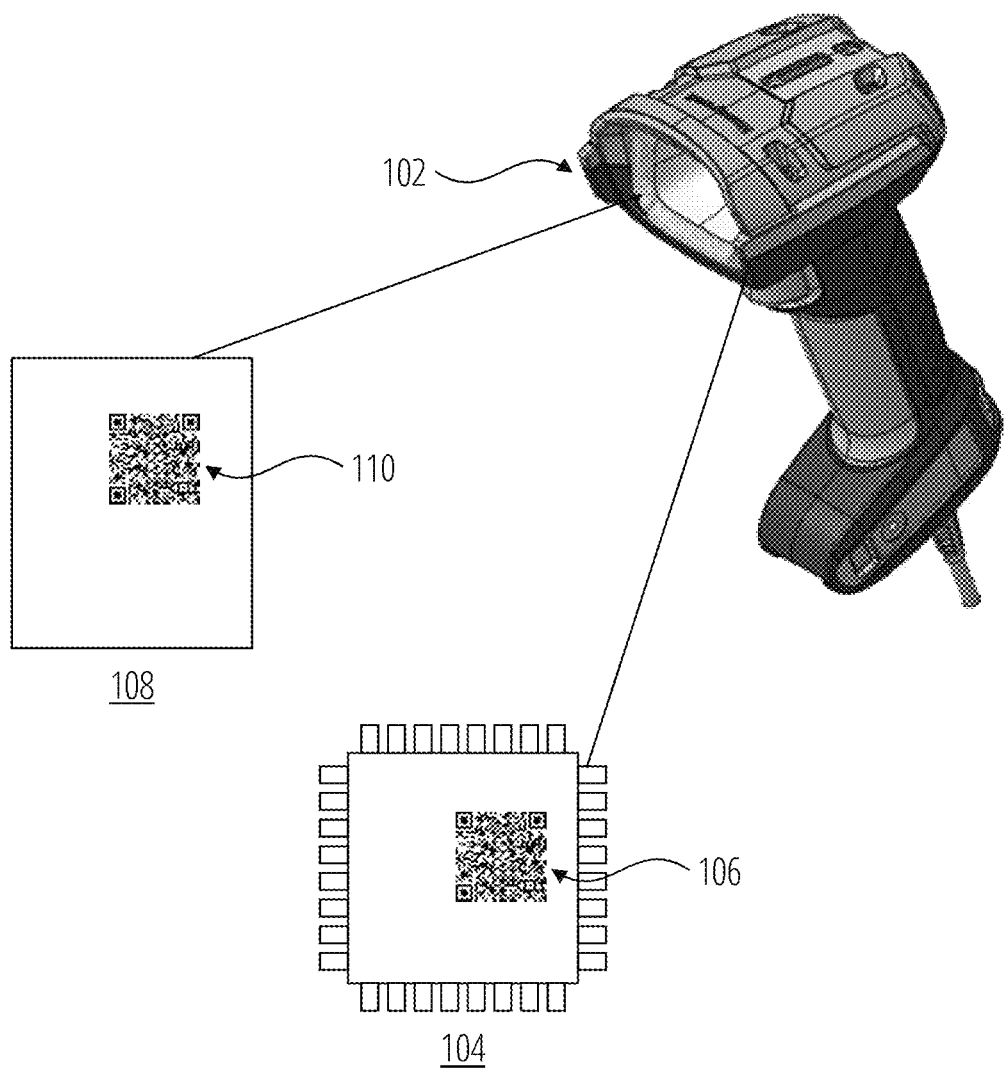
FIG. 1 illustrates example contexts for use of an example improved reader in accordance with at least some example embodiments of the present disclosure.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Definitions

"Aimer folding reflector" refers to any optical component that manipulates incoming light from an aimer to redirect the incoming light. Non-limiting examples of an aimer folding reflector include a mirror, a reflective material, and a refractive lens.

"Aimer illumination" refers to light produced by an aimer illuminator and corresponding optical components.

"Aimer illuminator" refers to any light producing component, or components, that produce a beam of light that is output or manipulated to a defined light pattern. Non-limiting examples of an aimer illuminator include one or more lasers or one or more narrow field LEDs.

"Aimer lens" refers to one or more optical components that receive light from an aimer illuminator to produce an aimer pattern.

"Analyzer" refers to a polarized optical filter.

"Back light illumination board" refers to a board that includes one or more light producing components oriented towards a diffuser back light reflector and/or diffuser.

"Board" refers to circuitry that connects one or more electrical components. Non-limiting examples of a board include a flex printed circuit board, a rigid printed circuit board, a single-sided printed circuit board, and a dual-sided printed circuit board, "Chassis" refers to a housing of an apparatus, and within which one or more electrical and/or mechanical components are positioned. A chassis may include any number of portions affixed to one another.

"Dark field illuminator" refers to one or more light producing component(s) of a dark field illuminator assembly.

"Dark field illuminator assembly" refers to a dark field illuminator and associated optical components to produce a dark field illumination that illuminates one or more field(s) of view.

"Diffuser" refers to one or more optical element(s) that produce a uniform illumination from one or more source illumination(s). In some embodiments, a diffuser diffuses the one or more source illumination(s) to produce a uniform illumination.

"Diffuser assembly" refers to a plurality of components that interact to produce a uniform output of light. In some embodiments, a diffuser assembly includes at least one illuminator as the source of an illumination, a diffuser back light reflector, and a diffuser.

"Diffuser back light reflector" refers to one or more optical component(s) that direct one or more source illumination(s) into a diffuser.

"Diffuser illuminator" refers to any light producing component, or components, that produce one or more illumination(s) to be manipulated by a diffuser.

"Illuminator" refers to any one or more mechanical and/or electrical component(s) that generate light.

"Image sensor" refers to a sensor that converts incoming light to generate a corresponding image. An image sensor captures an image from the incoming light to output the corresponding image.

"Imager board" refers to circuitry that includes at least one image sensor and/or processing circuitry for processing an image.

"Lens assembly" refers to one or more components that position one or more lens(es) in alignment with corresponding illuminator(s).

"Narrow field illuminator" refers to one or more light producing component(s) of a narrow field illuminator assembly.

"Narrow field illuminator assembly" refers to a narrow field illuminator and associated optical components to produce a concentrated illumination that illuminates a narrow field of view.

"Narrow field imager" refers to a narrow field sensor and associated narrow field lens(es) that define a narrow field of view capturable via the narrow field sensor.

"Narrow field lens" refers to one or more optical component(s) that receive source illumination(s) to produce a concentrated illumination that illuminates a narrow field.

"Narrow field of view" refers to a first field of view that is narrower in at least one direction than a corresponding wide field of view. In some embodiments a narrow field of view is narrower in multiple directions than a corresponding wide field of view, in some embodiments the narrow field of view is narrower in a single direction than a corresponding wide field of view.

"Narrow field sensor" refers to an image sensor that captures an image representation of a narrow field of view.

"Near-coaxial direction" refers to two or more axes that are generally directed towards the same axis. In some embodiments, near-coaxial directions include a first axis and a second axis that intersect at a particular point within one or more field of view(s).

"Polarized illuminator" refers to one or more light producing component(s) that is directed to a polarizer.

"Polarized illuminator assembly" refers to one or more components that operate in conjunction to produce a polarized illumination. In some embodiments a polarized illuminator assembly includes at least one polarizer and at least one polarized illuminator, and optionally one or more lens (es).

"Polarizer" refers to an optical filter that outputs polarized light from one or more source illumination(s).

"Polarizer holder" refers to one or more component(s) that position at least one polarizer.

"Processor" refers to hardware, software, firmware, and/or a combination thereof, that executes software instruction (s), application(s), and/or otherwise performs one or more defined algorithm(s).

"Protective window" refers to any component that allows light to pass through the component while preventing passing of object(s) from impacting components of an apparatus.

"Reflector" refers to any one or more optical components that redirect light from a first direction to a second direction.

"Ring illuminator assembly" refers to a plurality of illuminator assemblies arranged in a continuous manner. A ring illuminator assembly need not be perfectly circular, and can be circular, elliptical, square, or otherwise geometrically enclosed.

"Ring lens" refers to one or more optical components of a ring illuminator assembly that form the geometric shape of the ring illuminator assembly. In some embodiments, a ring lens includes a single molded lens.

"Viewing axis of the apparatus" refers to an axis that is coaxial or near co-axial with one or more axes normal to one or more imager(s) of an apparatus. In some embodiments, an aimer illumination is produced at the viewing axis of the apparatus.

"Wide field imager" refers to a wide field sensor and associated wide field lens(es) that define a wide field of view capturable by the wide field sensor.

"Wide field lens" refers to one or more optical components that receive source illumination(s) to produce a dark field illumination.

"Wide field of view" refers to a second field of view that is wider in at least one direction than a corresponding narrow field of view.

"Wide field sensor" refers to an image sensor that captures an image representation of a wide field of view.

Overview

In various contexts, code reader(s) are utilized to scan, decode, and/or otherwise interact with machine-readable symbologies (e.g., codes). Non-limiting examples of such contexts include use of a reader for direct part marking, as well as use of a reader for paper codes (e.g., on a label). Each of such contexts may pose particular problems to the reader's ability to function reliably. For example, in direct part marking, the manner in which a code is displayed may affect a reader's ability to successfully capture, detect, and/or decode the code. As one example, an engraved code on a highly reflective surface may cause some readers problems due to significant amounts of specular reflection. A particular reader that utilizes a particular illumination may be utilized in an attempt to eliminate this problem. Alternatively, a high contrast printed code on a highly reflective surface may cause that reader problems by failing to sufficiently illuminate the high contrast printed code utilizing the same illumination. In this regard, a particular reader may produce particular illuminations that are insufficient to enable the reader to successfully perform in both contexts. Additionally, certain contexts may require reading of printed codes in addition to direct part marking codes, further adding to the complexity of enabling successful scanning of all such codes. To address these problems, a user may be forced to utilize different readers to perform the various tasks successfully. Use of a non-cumbersome and portable reader that is capable of performing accurately in all such contexts is identified as preferable.

Improved readers (e.g., devices for scanning, detecting, and/or otherwise decoding machine-readable symbologies) and methods of use and operation are described herein. The improved readers include various illuminator assemblies that alone or in conjunction with other illuminators are configured to produce various types of illuminations, allowing capture of image representations of a plurality of fields of view illuminated by such illuminations. For example, some embodiments include a diffuser assembly that generates a diffuse or otherwise uniform illumination, narrow field illuminators that generate concentrated rays of light for illuminating at a large distance, polarized illuminators that generate polarized illuminations that can be used to limit specular reflectivity, and dark field illuminators that generate illumination of a near and/or wide field of view a high angle of incidence. Some embodiments include a plurality of image sensors associated with varying fields of view, further expanding the capabilities of such improved readers for functioning in multiple contexts.

Such improved readers are provided in a relatively small form factor. The small form factor enables a user to pick up and utilize the reader as a handheld device, and/or enables the reader to be fully mobile such that the user may carry around the user to perform various tasks. In some embodiments, the small form factor is achieved utilizing a particular arrangement of the components in a manner that optimizes the available space within a chassis of the apparatus. Specifically, in some embodiments the components are arranged into subassemblies that efficiently utilize available space, with the various subassemblies arranged in a "sandwiched" manner to reduce the total space ultimately taken up by all such components. In this regard, embodiments of the present disclosure include specially configured readers that are capable of mobility and functional to handle a wide arrangement of code scanning tasks in various contexts (e.g., for various types of codes, various materials, and/or the like), including for example various direct part marking codes in addition to traditional printed codes and/or label codes, without requiring use of separate devices.

The multiple types of illuminators and particular arrangement of such illuminators within the improved readers provide further advantages for successfully completing scanning operations (e.g., successfully detecting and decoding). Such improved readers improve the likelihood of successfully completing a scanning operation by providing access to any of such illuminator types. For example, different types of codes, different types of object materials, environmental factors, and/or combinations thereof, may affect the reader, such that light reflected back at the reader obscures, prevents, or otherwise affects the captured images in a manner that makes detecting and decoding a particular code difficult. The improved readers herein may attempt activation of particular illuminators that illuminate such a particular code sufficiently without negatively effecting captured representation(s), thus enabling improved accurate reading of a variety of code types in a myriad of contexts. For example, the same reader may be used to perform accurately in highly reflective direct part marking contexts while similarly performing well in printed paper code reading contexts by utilizing the particular illuminators of the improved readers described herein. Additionally or alternatively, some embodiments may be specially configured to increase the likelihood of activating particular illuminator(s) that result in a successful scanning operation, for example based on historical data associated with previous scanning operations and/or particular configuration of the embodiments to attempt scanning utilizing several different types of illumination.

Example Improved Scanning Operation Contexts

FIG. 1 illustrates example contexts for use of an example improved reader in accordance with at least some example embodiments of the present disclosure. Specifically, FIG. 1 depicts an example reader 102 in accordance with the present disclosure. The reader 102 is specially configured as described herein to accurately perform various code scanning tasks, such as by utilizing various specialized illuminator assemblies and a plurality of imagers (e.g., an image sensor associated with a wide field of view focused at a first distance, and a second image sensor associated with a narrow field of view focused at a second, further distance). As depicted, the same reader 102 is usable to perform scanning of direct part marking ("DPM") codes, for example the code 106 depicted on part 104, as well as paper printed codes, for example the code 110 depicted on paper material 108 (e.g., a label). The reader 102 may utilize different illuminations to illuminate one or more field(s) of view capturable via the reader 102, for example to illuminate the various codes 110 and 106 in a manner that enables decoding of a captured representation of the codes. In some embodiments, a user may activate the reader 102, for example by squeezing a trigger or otherwise inputting a signal that triggers the reader 102 to activate.

In some embodiments, the reader 102 is configured to operate based at least in part on one or more manual inputs. For example, in some embodiments, a user selects a mode of operation to cause the reader 102 to operate in accordance with the selected mode. In some such embodiments, the selected mode is utilized to determine what illuminators of the reader 102 are activated. In other embodiments, the reader 102 operates based at least in part on software instructions executed via the reader 102. For example, in some embodiments, the reader 102 is specially configured to perform based at least in part on one or more algorithm(s), data-driven determination(s), and/or the like, that increase the likelihood of successfully reading a code. In this regard, whether selected manually or via software-driven determination(s), the reader 102 may be utilized to scan the various codes 110 and 106 utilizing particular illuminations that reduce or eliminate the problems caused by other illumination types. In some embodiments, the reader 102 rotates through generating various different types of illuminations (e.g., utilizing different types of illuminators) and attempts capturing and decoding of a particular code with each of such generated illumination types.

Example Improved Apparatuses and Arrangement Thereof

Figure 2:
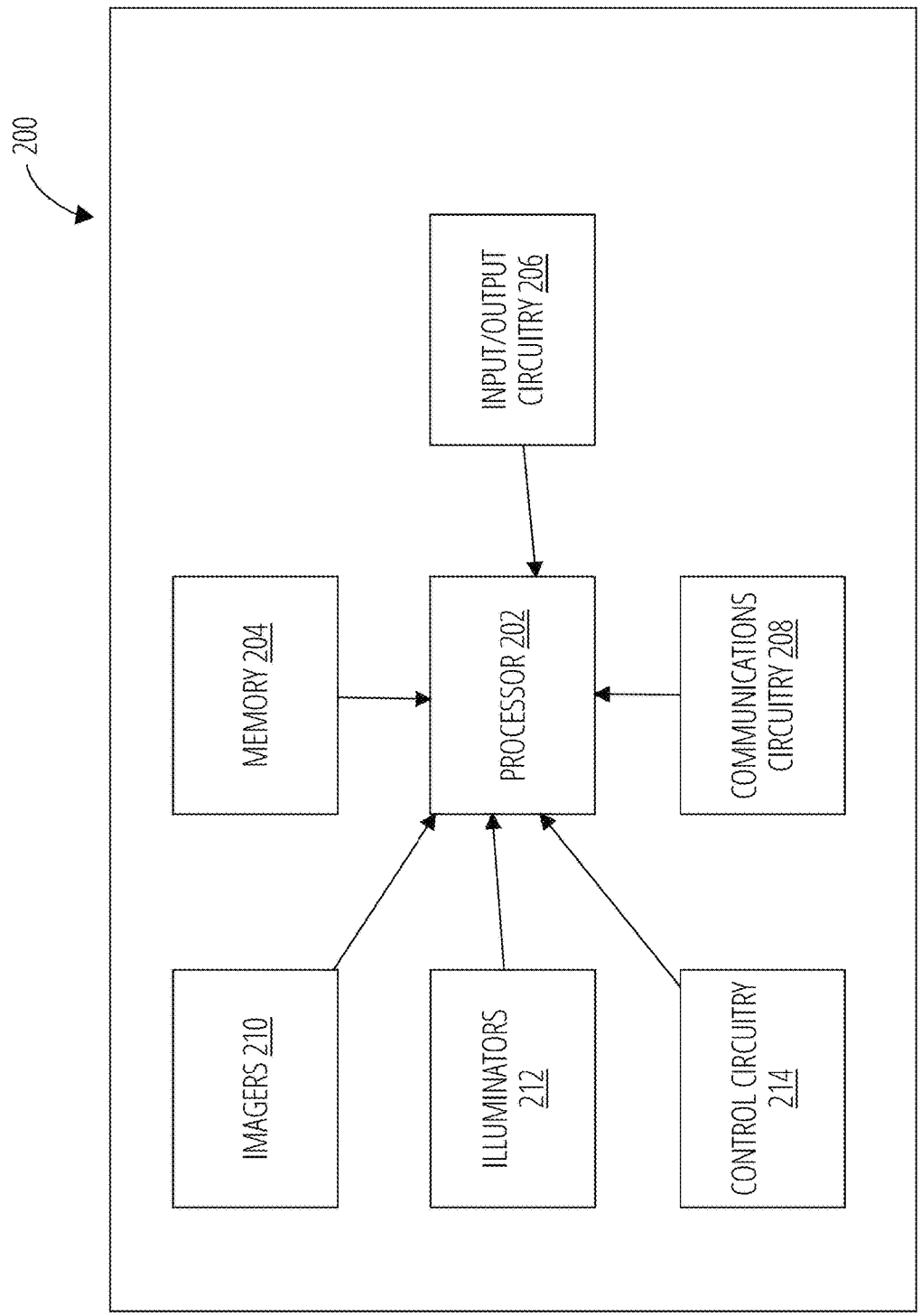
FIG. 2 illustrates a block diagram of an example improved reader in accordance with at least some example embodiments of the present disclosure.

FIG. 2 illustrates a block diagram of an example improved reader in accordance with at least some example embodiments of the present disclosure. In some embodiments, the reader 102 is embodied by the apparatus 200 as depicted and described with respect to FIG. 2. The apparatus 200 includes a processor 202, memory 204, input/output circuitry 206, communications circuitry 208, imagers 210, illuminators 212, and control circuitry 214. In some embodiments the apparatus 200 is configured, using one or more of the specially configured sets of circuitry embodying the processor 202, memory 204, input/output circuitry 206, communications circuitry 208, imagers 210, illuminators 212, and/or control circuitry 214 to execute the operations described herein.

Although components are described with respect to functional limitations, it should be understood that the particular implementations necessarily include the user of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software and/or firmware for configuring the hardware. For example, in some embodiments, "circuitry" includes processing circuitry, storage media, network interface(s), input/output device(s), and/or the like. Alternatively or additionally, in some embodiments, other elements of the apparatus 200 provide or supplement the functionality of another particular set of circuitry. For example, the processor 202 in some embodiments provides processing functionality to any of the other sets of circuitry, the memory 204 provides storage functionality to any of the other sets of circuitry, the communications circuitry 208 provides network interface functionality and/or communicability between the other sets of circuitry, and/or the like.

In some embodiments, the processor 202 (and/or co-processor or any other processing circuitry assisting or otherwise associated with the processor) is/are in communication with the memory 204, input/output circuitry 206, communications circuitry 208, imagers 210, illuminators 212, and/or control circuitry 214 via one or more bus(es), serial peripheral interface(s), and/or the like for passing information among components of the apparatus 200. Alternatively or additionally, in some embodiments, the processor 202 is communicable with some or all of the memory 204, input/output circuitry 206, communications circuitry 208, imagers 210, illuminators 212, control circuitry 214, and/or the like, via one or more board(s) that integrate the various components. For example, in some embodiments, a first board connects one or more imagers 210 with the processor 202 and/or a sub-processor thereof that controls activation and operation of the imagers 210 (e.g., data flow of a captured image from an imager to the processor 202), and a second board (or plurality of boards) connects one or more illuminators 212 with the processor 202 and/or a sub-processor thereof that controls activation of the one or more illuminators 212.

In some embodiments, for example the memory 204 is non-transitory and includes, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, and/or the like, for enabling the apparatus 200 to carry out the various functionality described in accordance with example embodiments of the present disclosure. For example, in some embodiments, the memory 204 stores computer-coded instructions that, upon execution, activate the apparatus 200 to perform particular functionality for performing one or more scanning operations (e.g., scanning for code(s)). Additionally or alternatively, in some embodiments, the memory 204 stores data associated with previously initiated and/or completed scanning operations, for example successful reads of code(s) via previous scanning operations, what illuminators were utilized to perform successful code reading operation(s), and/or the like.

In some embodiments, the processor 202 executes software application(s) that control activation of one or more components of the apparatus 200. For example, in some embodiments, the processor 202 executes one or more software application(s) that trigger signal(s) to activate one or more of the illuminators 212 and/or imagers 210 at particular timings. In some such embodiments, the processor 202 activates particular illuminators of the illuminators 212 to improve the likelihood of capturing a representation of a field of view, for example via the imagers 210, that is processable to detect and decode a particular code. In some embodiments, the processor 202 is communicatively coupled to each of the other components of the apparatus 200 that the processor 202 controls activation of, for example via one or more board(s), to send particular signal(s) that trigger such activation.

In various embodiments, the processor 202 is embodied in any of a number of different ways. In some embodiments, the processors 202 includes one or more processing devices configured to perform independently. For example, in some embodiments the processor 202 embodies a single or multiple cores that each execute particular instructions. In some embodiments, one or more of the core(s) are communicable with image sensor(s) of the apparatus 200, for example to receive images captured via the image sensor(s) of the imagers 210. In some embodiments, the processor 202 includes one or more sub-processor(s) configured to operate in tandem, for example via a bus to enable independent execution of instructions, pipelining, and/or multi-threading, or in series. The use of the terms "processor" and "processing circuitry" generally should be understood to include single-core processor(s), microprocessor(s), multi-core processor(s), remote processor(s), and the like both internal and external to the apparatus 200.

In some embodiments, the apparatus 200 includes input/output circuitry 206 that provides output to the user and/or receives indication(s) (e.g., particular data signal or trigger) of user input. In some embodiments, the input/output circuitry 206 is in communication with the processor 202 to provide such functionality. In some embodiments, the input/output circuitry 206 includes a mechanical trigger that generates a signal when a user of the apparatus 200 squeezes the trigger to a certain defined point, which activates the apparatus 200. In some embodiments, the apparatus 200 includes one or more mechanical or digital inputs, including but not limited to light indicator(s), button(s), toggle switch(es) and/or the like, that enable a user to select a mode of operation, configure one or more operational parameter(s) of the apparatus 200, and/or provide indication(s) of current configuration(s) of the apparatus 200. The input/output circuitry 206 in some embodiments comprises one or more user interface(s) and/or in some embodiments includes a display that comprises the interface(s) rendered as an application user interface, a command-line interface, a web interface, a client device, a peripheral, and/or the like. In some embodiments, the display embodies a touch-enabled interactive display that similarly facilitates user input and output. Alternatively or additionally still, in some embodiments, the input/output circuitry 206 includes a microphone and/or speaker that enables input of audio from a user (e.g., commands provided via voice) and/or output of audio (e.g., notifications, beep or tonal sounds, and/or voice messages) to the user. It should be appreciated that the input/output circuitry 206 may include any other input/output mechanism(s) that activate and/or facilitate operation of the apparatus 200 to perform the functionality described herein. In some embodiments, the processor 202 and/or the input/output circuitry 206 including a separate processor, is configured to control one or more function(s) of the user interface element(s) or other input/output mechanism(s) via computer program instructions (e.g., software and/or firmware, stored on a memory accessible to such circuitry, for example the memory 204.

The communications circuitry 208 includes any means, including in some embodiments a device or circuitry embodied in hardware, software, firmware, and/or any combination thereof, that is configured to receive and/or transmit data to the apparatus 200, from the apparatus 200, and/or between components of the apparatus 200. In some embodiments, the communications circuitry 208 includes hardware, software, firmware, and/or any combination thereof, that interfaces with a communications network and/or other computing device(s), circuitry, module(s), and/or the like that are external to the apparatus 200. In this regard, the communications circuitry 208 in some embodiments includes a networking interface for enabling communications via one or more wired and/or wireless communications mechanism(s). Additionally or alternatively, in some embodiments, the communications circuitry 208 includes one or more network interface card(s), antenna(s), bus(es), network switch(es), router(s), modem(s), and/or supporting hardware, firmware, software, and/or any other device suitable for enabling such communications. Alternatively or additionally, in some embodiments, the communications circuitry 208 includes circuitry for interacting with one or more short-range and/or long range antenna(s) responsible for performing such communications. The antenna(s) may facilitate communication via any of a myriad wireless communication protocol(s) and mechanism(s), including and without limitation Bluetooth, NFC, Wi-Fi, Zigbee, RF transmission, and/or any other standardized or custom wireless networking interface. Alternatively or additionally still, in some embodiments the communications circuitry 208 includes one or more wired communication interface(s) capable of data transfer via a fixed input/output wire, and/or via a removable input/output wire. It will be appreciated that the wired communication interface(s) may operate utilizing any of a myriad of wired communication protocols and/or technologies, including and without limitation ethernet, USB 2.0, USB 3.0, USB-C, mini-USB, micro-USB, or any other standardized or custom wired networking interface.

The imagers 210 includes any number of image sensor(s) and associated optical component(s), for example one or more lens(es), reflector(s), and/or the like, that define field(s) of view that the apparatus 200 may capture representation(s) of via the image sensor(s). In some embodiments, each imager enables capture of a particular field of view defined by the image sensor and associated optical component(s). In some embodiments, the imagers 210 includes at least a narrow field imager that is configured to capture an image representation of a narrow field of view, and a wide field imager that is configured to capture an image representation of a wide field of view. The narrow field of view and the wide field of view may be associated with differing focal ranges, for example where the narrow field of view is associated with a first focal range that is further from the apparatus 200 than a second focal range associated with the wide field of view. In this regard, apparatuses with a plurality of imagers having different fields of view and/or focal ranges enables capture of different images to improve the operational capabilities of the apparatus 200 at handling differing contexts and code types. In some embodiments, the image sensors of the imagers 210 are arranged on a particular board or set of board(s) that enables activation of the image sensor(s) in parallel or in series, transmission of the image(s) captured by such image sensor(s) to other component(s) of the apparatus 200 (e.g., to the processor 202) for further processing, communication, and/or storage. It will be appreciated that in some embodiments, the images from the image sensor(s) of the imagers 210 are transmitted to and processed by one or more processor(s), such as the processor 202, to perform code detection and decoding utilizing the captured images.

The illuminators 212 includes any number of illumination producing components and associated optical components for generating illumination(s) of particular strength(s), pattern(s), and/or the like. In some embodiments, the illuminators 212 include various LEDs that are aligned with optical components that concentrate, diffuse, and/or otherwise redirect the light from the LEDs in a particular manner. For example, in some embodiments, the illuminators 212 include at least one polarized illuminator, at least one dark field illuminator, at least one narrow field illuminator, at least one diffuser illuminator, and/or at least one aimer illuminator. The illuminator(s) may be electronically coupled with at least one board, for example connecting the illuminators 212 with the processor 202 to facilitate activation of the illuminators 212 in accordance with one or more mode(s) of operation. Alternatively or additionally, in some embodiments, different illuminators of the illuminators 212 are electronically coupled with different board(s) of the apparatus 200, for example to position the illuminators at different locations within the apparatus 200 for purposes of space saving.

The control circuitry 214 includes hardware, software, firmware, and/or a combination thereof, that supports various functionality associated with controlling operation of the apparatus 200, for example to activate illuminators of the apparatus 200, activate imagers of the apparatus 200, and/or receive and process data received from the imagers. In some embodiments, the control circuitry 214 includes hardware, software, firmware, and/or a combination thereof, that enables setting an operational mode of the apparatus 200, for example that controls an order of activation of one or more components or timing of activation of one or more of the components. Additionally or alternatively, in some embodiments, the control circuitry 214 includes hardware, software, firmware, and/or a combination thereof, that facilitates transfer of images from imagers to one or more processor(s) that process the image(s) to detect and decode code(s) depicted therein. Additionally or alternatively, in some embodiments, the control circuitry 214 includes hardware, software, firmware, and/or a combination thereof, that stores data associated with previously initiated scanning operations, for example and without limitation illuminator(s) utilized during such scanning operations, whether such scanning operations were successful, and/or computer-coded instructions for processing data associated with historical or recently-initiated scanning operations (e.g., those performed within a particular time period, since last powering off the apparatus 200, and/or the like). It will be appreciated that, in some embodiments, the control circuitry 214 includes a separate processor, specially configured field programmable gate array (FPGA), or a specially programmed application specific integrated circuit (ASIC).

It will be appreciated that, further in some embodiments, one or more of the sets of circuitries 202-214 are combinable. Alternatively or additionally, in some embodiments, one or more of the sets of circuitry 202-214 perform some or all of the functionality described associated with another component. For example, in some embodiments, one or more of the sets of circuitry 202-214 are combined into a single module embodied in hardware, software, firmware, and/or a combination thereof. Similarly, in some embodiments, one or more of the sets of circuitry, for example control circuitry 214, is combined with the processor 202, such that the processor 202 performs one or more of the operations described above with respect to such modules.

In some embodiments, the reader 102 is embodied as the apparatus 200. The description herein with respect to the reader 102, and other exemplary reader(s) described herein, embody particular representations of the apparatus 200.

Figure 3:
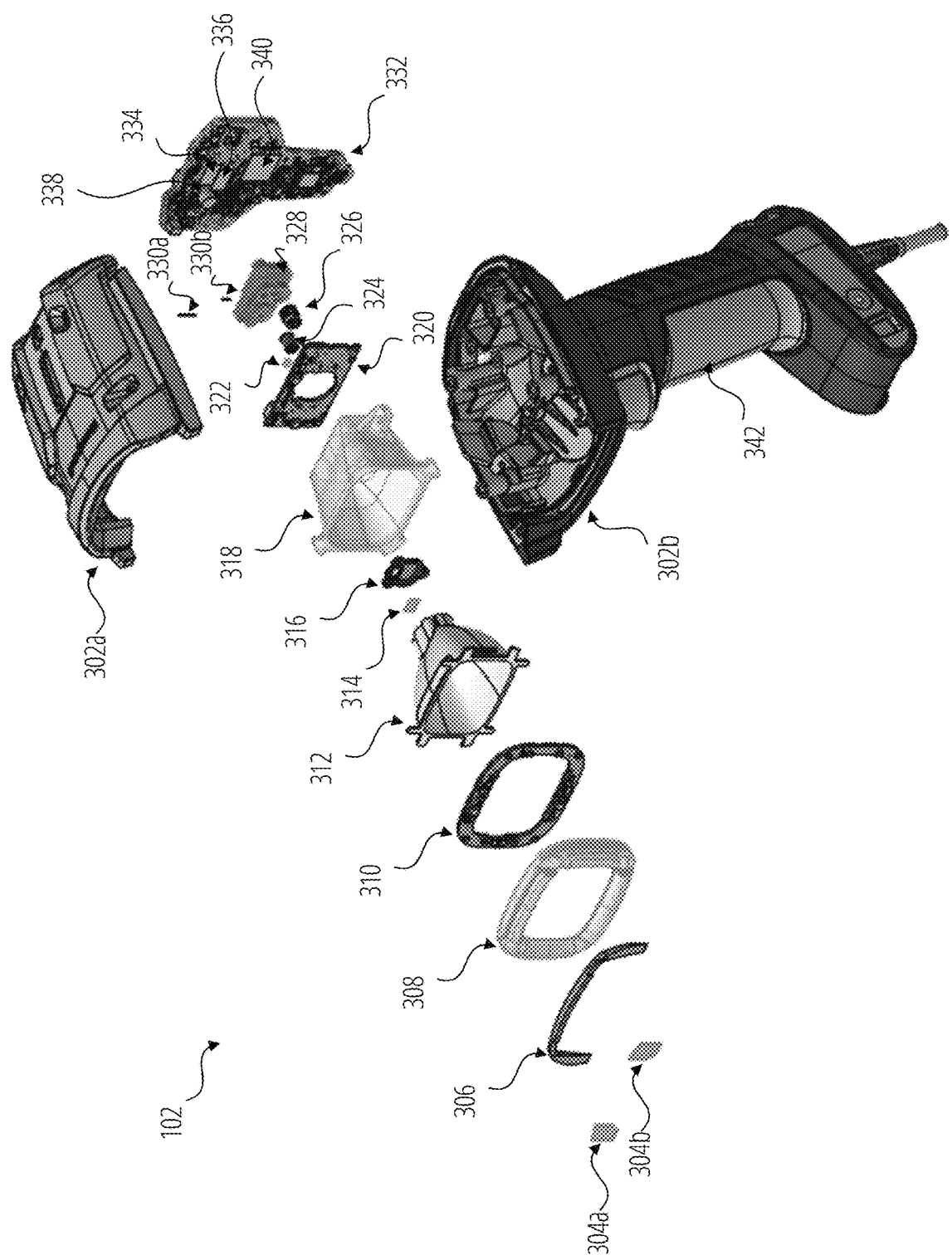
FIG. 3 illustrates an exploded view of an example improved reader in accordance with at least some example embodiments of the present disclosure.

FIG. 3 illustrates an exploded view of an example improved reader in accordance with at least some example embodiments of the present disclosure. Specifically, FIG. 3 depicts an exploded view of an example implementation of the improved reader 102. The exploded view depicts a plurality of components arranged to form the reader 102. As described herein, in some embodiments the components of the reader 102 are arranged, for example as depicted, to reduce the overall size of the reader 102.

As illustrated in FIG. 3, the reader 102 includes an apparatus chassis (e.g., a "chassis") that stores components of the reader 102. Specifically, the reader 102 includes chassis portion 302a embodying a top portion of a chassis, and chassis portion 302b embodying a bottom portion of the chassis. In some embodiments, the chassis portion 302a and the chassis portion 302b are configured to be affixed, connected, or otherwise coupled to form a complete housing, for example by snapping together to enclose all components of the reader 102. In some embodiments, the chassis portion 302a and the chassis portion 302b are mechanically secured, chemically sealed, and/or the like, to enclose all such components. It will be appreciated that, in other embodiments, the chassis of the reader 102 includes multiple other chassis portions.

Additionally or alternatively, in some embodiments, the chassis embodies or includes one or more portions representing external components utilized for holding, positioning, and/or operating the reader 102. For example, as illustrated the chassis portion 302b includes handle 342. The handle 342 embodies an external, elongated portion of the chassis that is designed to enable a user to place their hand around the reader 102 and orient the reader 102 towards a code to be read. In some embodiments, the handle 342 is angled to enable a user to comfortably angle the reader 102 in a manner such that illuminations produced via the reader 102 reach a code to be scanned while minimizing the likelihood of direct light reflection from such illuminations impacting sensor(s) of the reader 102. Additionally or alternatively, in some embodiments, one or more portion(s) of the chassis embody, house, or otherwise include components for activating the reader 102 (e.g., a trigger), setting an operational mode of the reader 102, and/or the like.

The reader 102 further includes polarizer 304a and polarizer 304b. In some embodiments, each of the polarizers 304a and 304b embody optical filters that permits light of particular polarization through while filtering light of other polarizations. In this regard, the polarizers 304a and 304b output polarized light from one or more illuminations, for example produced by one or more polarized illuminator(s). In this regard, the polarizers 304a and 304b may each be part of a polarized illuminator assembly that produces polarized light of a particular polarization.

The reader 102 further includes a polarizer holder 306. The polarizer holder 306 in some embodiments comprises a structural lens, optical component, or other physical body that maintains a particular physical structure for securing the polarizers 304a and 304b in particular positions with respect to one or more corresponding optical components and/or illuminators. For example, as illustrated, the polarizer holder 306 is constructed as a rigid body to secure the polarizers 304a and 304b at the top left and top right corners of the ring lens 308.

The reader 102 further includes a ring lens 308. In some embodiments, the ring lens 308 comprises optical components for generating particular illumination(s) from light produced by any number of illuminators of a ring illuminator assembly. In some embodiments, for example, the ring lens 308 includes edge optical components relatively centered along the top, bottom, left, and right edges of the ring lens 308 for producing one or more dark field illuminations from illuminators relatively aligned with such edge optical components. Additionally or alternatively, in some embodiments the ring lens 308 includes optical components in the top left and top right corners of the ring lens 308 for producing one or more illuminations to the polarizer 304a and polarizer 304b. In some embodiments, such corner optical components associated with polarized illuminators output condensed light to one of the polarizers 304a or 304b, which are subsequently utilized to illuminate one or more fields of view.

The reader 102 further includes a board 310. In some embodiments, the board 310 comprises a single, particular circuitry board (e.g., a PCB) that includes a plurality of activatable illuminators. The board 310 is structured as a ring that defines a void or hole in the center of the ring that allows for passage of light in or out of one or more components behind the ring, for example via the diffuser 312 as described herein. In this regard, it will be appreciated that the ring shape similarly enables alignment of the illuminators of board 310 with the corresponding optical components of the ring lens 308 having the same or a similar ring shape without impeding the passage of light via the void or holes in said ring.

In some embodiments, such illuminators correspond to particular optical components embodying portions of the ring lens 308, and/or corresponding optical components further in front of said ring lens 308, such as the polarizers 304a and 304b. For example, in some embodiments the board 310 includes at least one illuminator embodying a polarized illuminator in the top left corner of the board 310, and includes at least one illuminator embodying a polarized illuminator in the top right corner of the board 310. These illuminators are aligned with corner optical components of the ring lens 308 and polarizers 304a and 304b, forming polarized illuminator assemblies that each produce polarized illuminations.

In some embodiments, the board 310 includes illuminators one or more edge illuminators, for example positioned centrally or relatively centrally (e.g., within a determinable acceptable tolerance distance) from the center of the left edge, the right edge, the top edge, and the bottom edge of the board 310. Such illuminators in some embodiments embody dark field illuminators to be used for dark field imaging by providing high incidence light at close distances from a particular field of view. These dark field illuminators in some embodiments are aligned with particular corresponding optical components of the ring lens 308, for example optical lenses positioned at each of the top, right, bottom, and left edges of the ring lens 308. In this regard, the associated dark field illuminator of the board 310 and corresponding optical components of the ring lens 308 form a plurality of dark field illuminator assemblies that each produce dark field illuminations.

Further still, in some embodiments the board 310 includes at least one illuminator embodying a narrow field illuminator, for example at least one illuminator positioned at the bottom left corner of the board 310 and at least one illuminator positioned at the bottom right corner of the board 310. These illuminators are aligned with corner optical components of the ring lens 308, for example forming narrow field illuminator assemblies that each produce a narrow field illumination. For example, in some embodiments the light produced via the narrow field illuminators of the board 310 are produced and corresponding condensed narrow field illuminations are produced through the corresponding optical components of the ring lens 308 aligned with said illuminators.

In some embodiments the particular arrangement, orientation, and positions of the illuminator assemblies discussed with respect to the components 304a/b-310 may differ from that depicted in the figures herein. For example, in some embodiments, the polarized illuminator assemblies may be aligned at the bottom corners of the apparatus (e.g., polarizers aligned with particular optical components at the bottom corners of the ring lens 308, with corresponding polarized illuminators at the bottom corners of the board 310), and/or the narrow field illuminator assemblies may be aligned at the top corners of the apparatus (e.g., particular optical components at the top corners of the ring lens 308, with corresponding narrow field illuminators at the top corners of the board 310). Additionally or alternatively, in some embodiments one or more of the dark field illuminator assemblies may differ from one another (e.g., different strength illuminators, different optical components to produce different illuminations, and/or the like), and in other embodiments the dark field illuminator assemblies may each be the same with differing rotations from the central axis of the field of views capturable via the reader 102.

In some embodiments, the ring illuminator assembly includes any number or combination of illuminator assembly types. For example, in some embodiments, the ring illuminator assembly need not include one or more of the polarized illuminator assembly, the narrow field illuminator assembly, and/or the dark field illuminator assembly(s), and in some embodiments may include one or more of the remaining illuminator assembly types at such positions. For example, in some embodiments, the ring illuminator assembly only includes dark field illuminator assemblies. In other embodiments, the ring illuminator assembly only include dark field illuminator assemblies and narrow field illuminator assemblies, or only includes dark field illuminator assemblies and polarized illuminator assemblies. Alternatively or additionally, in some embodiments, the ring illuminator assembly does not include any dark field illuminator assemblies, and only includes one or more narrow field illuminator assemblies and/or one or more polarized illuminator assemblies, for example, or another illuminator assembly type.

The reader 102 further includes diffuser 312. The diffuser 312 scatters incoming light to produce an illumination that is more balanced or uniform illumination (e.g., without significant pockets of increased dark or light spots). In some embodiments, the diffuser 312 embodies a dome diffuser that generally embodies a dome-like structure. In such embodiments, the dome-like structure scatters the light in various directions, thus diffusing the light throughout a field of view. In some such embodiments, the dome structure defines an outer perimeter that enables the passage of light out of the diffuser (e.g., a diffuse illumination produced via the diffuser 312 and corresponding components of a diffuser assembly and passage of light inwards towards image sensor (s) behind the diffuser 312. In some such embodiments, one or more components of a ring illuminator assembly, for example the ring lens 308 and/or board 310, are affixed to the diffuser 312 along the perimeter or corners of the outer perimeter of the diffuser 312 to ensure alignment of such components. It will be appreciated that in some embodiments, other light diffuser mechanisms may be utilized in place or additional to the diffuser 312. In some embodiments, the diffuser 312 is semi-transparent to enable incoming light to be diffused via the diffuser 312 into a more uniform illumination.

The reader 102 further includes a diffuser back light reflector 318. The diffuser back light reflector 318 receives incoming light from one or more illuminators (e.g., diffuser illuminators) and directs such light into the diffuser 312. For example, in some embodiments, the diffuser back light reflector 318 comprises one or more optical components that that directs light from any number of illuminators to one or more points along the diffuser 312, such that the diffuser 312 receives the light and produces a diffuse illumination utilizing such incoming light. In some embodiments, the diffuser back light reflector 318 embodies a single molded optical component. In other embodiments, the diffuser back light reflector 318 embodies separate optical components affixed together or positioned in alignment with one another.

In some embodiments, the diffuser back light reflector 318 performs various securing and illumination functions. For example, in some embodiments, the diffuser back light reflector 318 is aligned with the diffuser 312 such that incoming light (e.g., from one or more illuminators of the board 320, as described herein) is reflected or otherwise directed to the back of the diffuser 312 to produce a corresponding uniform diffuse illumination. Additionally or alternatively, in some embodiments, the diffuser back light reflector 318 couples or otherwise secures one or more components of a diffuser illuminator assembly in alignment with one or more other components. For example, in some embodiments, the diffuser back light reflector 318 tightly secures the protective window 316 and the analyzer 314 to the back of the diffuser 312. Additionally or alternatively, in some embodiments, the diffuser back light reflector 318 is configured to receive one or more securing mechanism(s) of another component, for example one or more illumination lenses and/or of a ring illuminator assembly, to secure such components alignment with one or more other components.

The reader 102 further includes an analyzer 314. The analyzer 314 is positioned towards the back end of the diffuser 312, for example in alignment with an opening of the diffuser 312 and one or more lens(es) associated with imagers of the reader 102. In some embodiments, the analyzer 314 comprises a polarized optical component that filters out light of particular polarizations. In this regard, the analyzer 314 blocks light of unwanted polarizations to eliminate or reduce the effects of unwanted light on the image sensors positioned behind the analyzer 314. In some embodiments, the analyzer 314 comprises a polarizer that allows light of the reverse polarities than the polarizer(s) of the polarized illuminator assemblies of the reader 102. For example, as illustrated, in some embodiments the analyzer 314 blocks opposite polarizations from a first polarization permitted by the polarizers 304a and 304b. In this regard, the analyzer 314 prevents unwanted incidence of light from reaching the image sensors therein. In some embodiments, the analyzer 314 is optionally included.

The reader 102 further includes a protective window 316. In some embodiments, the protective window 316 embodies a transparent or semi-transparent structure that physically protects one or more other components of the reader 102, for example by physically blocking an opening in the diffuser 312 and diffuser back light reflector 318 that is in alignment with one or more imagers of the reader 102. In this regard, the protective window 316 may include a rigid or flexible structure that protects from external objects or particles entering the reader 102 and impacting the imagers. In some embodiments, the protective window 316 comprises a glass panel, or reinforced/structurally improved glass panel, that is affixed to the back of the diffuser 312 or diffuser back light reflector 318 directly or via a supporting frame. In some embodiments, the protective window 316 is optionally included.

The reader 102 further includes a board 320. In some embodiments, the board 320 comprises a single particular circuitry board (e.g., a PCB) that includes one or more activatable illuminators utilized in generating a diffuse illumination via the diffuser 312 and diffuser back light reflector 318. For example, in some embodiments, the board 320 includes one or more diffuser illuminator(s) aligned with the diffuser back light reflector 318. In some embodiments, the board 320 defines a void space or hole that enables one or more lens(es) to be positioned near the center of the board 320. In this regard, the board 320 may include one or more diffuser illuminator(s) on either side of the hole in the board 320, on top or bottom of the hole in the board 320, and/or the like, to provide sufficient light for directing via the diffuser back light reflector 318. In some embodiments, the board 320 includes a plurality of diffuser illuminators that provide relatively uniform light at various points throughout the diffuser back light reflector 318. These diffuser illuminators of the board 310 together with the corresponding diffuser 312 and diffuser back light reflector 318 form a diffuser assembly that produces diffuse illuminations.

The reader 102 further includes an aimer lens 322. In some embodiments, the aimer lens 322 embodies one or more optical components that generate an aimer illumination from incoming light. In some embodiments, the aimer lens 322 produces an aimer illumination of a particular pattern from incoming light, for example produced from an aimer illuminator. For example, in some embodiments, the aimer lens 322 produces a linear illumination pattern from incoming light, and/or collimates the incoming light for producing a particular aimer pattern. In some embodiments, the aimer lens 322 is secured in a position aligned with a component that directs incoming light to the aimer lens 322, for example directly in alignment with an aimer illuminator, or in some embodiments with one or more reflectors that direct light from an aimer illuminator to the aimer lens 322.

The reader 102 further includes lens 324. In some embodiments, the lens 324 embodies a narrow field lens that is associated with a corresponding narrow field image sensor and defines a particular narrow field of view that is capturable by the narrow field image sensor. In this regard, in some embodiments the lens 324 is aligned with a corresponding narrow field image sensor, such that light progresses through the lens 324 to impact the corresponding narrow field image sensor. In some embodiments, for example, the lens 324 is aligned with the image sensor 334 as described further herein, where the lens 324 and the image sensor 334 form a narrow field imager.

The reader 102 further includes lens 326. In some embodiments, the lens 326 embodies a wide field lens that is associated with a corresponding wide field image sensor and defines a particular wide field of view that is capturable by the wide field image sensor. In this regard, in some embodiments the lens 326 is aligned with a corresponding wide field image sensor, such that light progresses through the lens 326 to impact the corresponding wide field image sensor. In some embodiments, for example, the lens 326 is aligned with the image sensor 336 as described further herein, where the lens 326 and the image sensor 336 form a wide field imager. In some such embodiments, the wide field of view is wider than the narrow field of view in at least one direction (or a plurality of directions). In some embodiments, the lenses 326 and 324 are constructed differently to define the different field of views based on different focal lengths, or are positioned at different distances from the corresponding image sensors 334 and 336.

The reader 102 further includes a plurality of reflectors, specifically reflector 330a and reflector 330b. In some embodiments, each reflector comprises reflective material(s) and/or lenses that redirect incoming light in a particular direction. For example, in some embodiments, the reflectors 330a and 330b each embody a mirror angled to reflect light in a particular direction. It will be appreciated that in some embodiments, the reflector 330a and/or the reflector 330b is embodied by another optical component that similarly redirects incoming light in a particular direction.

In some embodiments, the one or more reflectors of the reader 102 are positioned and aligned to redirect incoming light from an aimer illuminator towards or in accordance with a viewing axis of the apparatus. For example, in this regard the reflector 330a in some embodiments first folds light produced by an aimer illuminator towards a central axis of the reader 102. The redirected light is specifically directed towards the reflector 330b. The reflector 330b then redirects the light along the viewing axis of the apparatus towards the field of views capturable via the reader 102. For example, in some embodiments the reflector 330b redirects the light along a viewing axis of the apparatus that is near-coaxial with and relatively central (e.g., within defined tolerances) between the narrow and wide fields of view capturable via the reader 102 towards a corresponding aimer lens for projection into such fields of view. It should be appreciated that the reflector 330a and/or reflector 330b may be embodied in a smaller component than a corresponding aimer illuminator that generates the light ultimately projected as the aimer illumination, and thereby allows for the aimer illumination to be projected at a position more central to the fields of view capturable via the reader 102 without requiring the aimer to actually be positioned at such a location, since the size of the aimer may preclude the aimer from being positioned at such a location without offsetting by an unacceptable amount the fields of view capturable by a plurality of imagers of the reader 102. As such, the reflectors enable the aimer illumination to be produced in smaller reader configurations at a defined position within the fields of view without undesirably offsetting the image sensors associated with such fields of view, which would otherwise negatively impact the ability to successfully perform scanning operations utilizing the sensors due to such offset.

The reader 102 further includes a component holder 328. In some embodiments, the component holder 328 comprises a physical structure that positions one or more components of the reader 102 in particular positions to align such components with other components located behind the component holder 328. For example, in some embodiments the component holder 328 is molded to position the lenses 324 and 326 in alignment with corresponding image sensors. Additionally or alternatively, in some embodiments the component holder 328 positions the reflector 330a and/or reflector 330b at defined positions to enable redirecting of light along a particular viewing axis of the apparatus. In some embodiments, the component holder 328 comprises a single molded portion, or plurality of individual portions affixed or secured together, that defines a cavity to receive each component as described, and/or to secure the component within its respective cavity.

The reader 102 further includes a board 332. The board 332 includes the imaging and illuminator components located furthest back from the optical and illumination components described above. In some embodiments, the board 332 comprises a circuitry board (e.g., a PCB) that includes one or more activatable image sensor(s) utilized to capture image representations of one or more field(s) of view. Additionally or alternatively, in some embodiments, the board 332 comprises one or more aimer illuminator(s) associated with generating an aimer illumination, for example via the aimer lens 322 and/or reflectors 330a and 330b. Additionally or alternatively still, in some embodiments, the board 332 includes processing circuitry utilized for controlling one or more component(s) and/or processing particular data (e.g., captured images of one or more field(s) of view to detect and decode particular captured code(s)). In some embodiments, the board 332 is embodied by a single circuitry board. In other embodiments, the board 332 includes a plurality of interconnected circuitry boards. In some other embodiments, the board 322 includes only a single image sensor associated with a single imager capturing a single field of view. Alternatively or additionally, in some other embodiments, the board 322 includes three or more image sensors, each associated with a different field of view, and which may have the same or different focal ranges.

The reader 102 further includes aimer illuminator 338. The aimer illuminator 338 is communicatively coupled with the board 332, for example to enable activation of the aimer illuminator 338 via the board 332. The aimer illuminator 338 outputs light utilized to produce a corresponding aimer illumination, for example of a particular pattern. For example, in some embodiments, the aimer illuminator 338 is aligned with one or more reflectors that redirect the light to one or more aimer lens(es), such as the reflector 330a. Alternatively or additionally, in some embodiments, the aimer illuminator 338 is aligned with the aimer lens 322 directly. In some embodiments, the aimer illuminator 338 comprises one or more laser(s) and/or high-concentration LEDs that outputs a concentrated ray of light.

The reader 102 further includes image sensor 334. The image sensor 334 is communicatively coupled with the board 332, for example to enable activation of the image sensor 334 via the board 332. The image sensor 334 captures an image based on light incident to or otherwise impacting the image sensor 334. In some embodiments, the image sensor 334 captures an image representing a particular field of view, for example an image representation of a field of view defined by one or more associated optical component(s). In some embodiments, the image sensor 334 is aligned with the lens 326 to define a particular field of view.

The reader 102 further includes image sensor 336. The image sensor 336 is communicatively coupled with the board 332, for example to enable activation of the image sensor 336 via the board 332. The image sensor 336 similarly captures an image based on light incident to or otherwise impacting the image sensor 336. In some embodiments, the image sensor 336 captures an image representing a second field of view, for example an image representation of a field of view defied by one or more associated optical component(s). In some embodiments, the image sensor 336 is aligned with the lens 324 to define a particular field of view.

In some embodiments, the image sensor 334 and the image sensor 336, alone or together with lens 324 and/or lens 326, define a plurality of field of views. For example, in some embodiments the image sensor 334 and lens 326 embody a first imager defining a first field of view, and the image sensor 336 and lens 324 embody a second imager defining a second field of view. The field of views may differ in at least one direction. For example, in some embodiments, the first field of view corresponds to a narrow field of view and the second field of view corresponds to a wide field of view, where the wide field of view is wider than the narrow field of view in at least one direction. In some embodiments, the field of views are defined based at least in part on the optical components associated with each image sensor. Alternatively or additionally, in some embodiments, the field of views are defined based at least in part on the configuration of the image sensors themselves, for example based at least in part on the resolution of each image sensor. In this regard, it will be appreciated that the images generated via the image sensor 334 may differ from the images generated via the image sensor 336.

The reader 102 further includes processor 340. The processor 340 is communicatively coupled with the board 332, for example to enable transmission of data to the processor 340 from other components of the reader 102 and/or from the processor 340 to other components of the reader 102. For example, in some embodiments the processor 340 is communicatively coupled with one or more illuminator(s), for example the aimer illuminator 338, one or more illuminators of the other board(s) 310 and/or 320, and/or the like. Additionally or alternatively, in some embodiments the processor 340 is communicatively coupled with the image sensors 334 and/or 336.

Additionally or alternatively, in some embodiments, the processor 340 executes computer-coded instructions embodying one or more software application(s). The software application(s) in some embodiments control one or more aspect(s) of the reader 102. For example, in some embodiments the processor 340 executes one or more software application(s) that determine when to activate one or more image sensor(s) of the reader 102, when to activate one or more illuminator(s) of the reader 102, which illuminator(s) of the reader 102 to activate, and/or the like. For example, in some embodiments, upon activation the processor 340 executes software application(s) that perform(s) one or more predefined algorithm(s), machine learning model(s), and/or artificial intelligence model(s) that determine when and/or which components of the reader 102 should be activated.

In some embodiments, the various board(s) of the reader 102 are communicable with one another. For example, in some embodiments, the board 332 is communicatively coupled with the board 310 and/or board 320. In such embodiments, signal(s) and/or data may be sent from a particular board to one or more other board(s). For example, in some embodiments activation signal(s) is/are transmitted from the board 332 to the board 310 and/or to the board 320, such as to activate illuminator(s) thereon. In some embodiments, the various board(s) of the reader 102 are separate from one another, and may be activated via the same mechanism(s) (e.g., a trigger of the reader 102, not depicted).

In some embodiments, one or more components of the reader 102 are connected to form assemblies of the reader 102. Similarly, in some embodiments, the assemblies of the reader 102 are connected to one another to fit all components within a portion of the chassis. For example, in some embodiments the polarizer 304a, polarizer 304b, polarizer holder 306, ring lens 308, and board 310 form a ring illuminator assembly, with each component physically or chemically secured to the component behind it (e.g., with the polarizers 304a and 304b in the front most positions). Additionally or alternatively, in some embodiments, the diffuser 312, analyzer 314, protective window 316, diffuser back light reflector 318, and board 320 form a diffuser assembly, with each component physically or chemically secured to the component behind it. Additionally or alternatively still, in some embodiments, the aimer lens 322, lens 324, lens 326, component holder 328, reflector 330a, and reflector 330b form a lens assembly, with each lens and reflector physically or chemically secured to the component holder 328. Additionally or alternatively still, in some embodiments the board 332, image sensor 334, image sensor 336, aimer illuminator 338, and processor 340 form an imager board. The various assemblies, such as the ring illuminator assembly, diffuser assembly, lens assembly, and imager board are each physically or chemically affixed.

In some embodiments, the various depicted components of the reader 102 are affixed or otherwise connected to the chassis of the reader 102. For example, in some embodiments, one or more securing components (e.g., screws, rivets, and/or the like) are utilized to secure the assemblies to the chassis. Additionally or alternatively, in some embodiments, the chassis includes one or more portions that extend outward to enable snapping into particular portions of one or more components of the reader 102.

It will be appreciated that the various components of the reader 102 may be aligned and/or secured in any of a myriad of manners. In some embodiments, the board 320 and the board 332 are each secured to an apparatus chassis, for example chassis portions 302a and/or 302b. In this regard, such components secured to the chassis of the apparatus may be further secured (e.g., directly or indirectly) to each other component of the reader 102. For example, various lenses (e.g., associated with one or more image sensors and/or an aimer), aimer reflector(s), and/or the like in some embodiments are secured to the component holder 328, which may be secured to the board 332 as described herein. Alternatively or additionally, in some embodiments one or more polarizers are secured to a polarizer holder 306, which may be secured to the ring lens 308, which is subsequently secured to the board 310 to form a ring illuminator assembly. Additionally or alternatively still, in some embodiments the analyzer 314, the protective window 316, and/or the diffuser back light reflector 318 are secured the diffuser 312, and similarly the diffuser back light reflector 318 is secured to the board 320, for example forming a diffuser illuminator assembly. In some embodiments, the ring illuminator assembly is secured to the front of the diffuser illuminator assembly (e.g., along the perimeter of the opening of the diffuser 312), forming a front illuminator assembly. In this regard, securing a single component of the front illuminator assembly, for example the board 320, within the apparatus maintains the position and relative alignment of each component of the front illuminator assembly. In this regard, the various components of the reader 102 may be secured in place and in alignment without requiring each component to be individually secured via the chassis.

Figure 4:
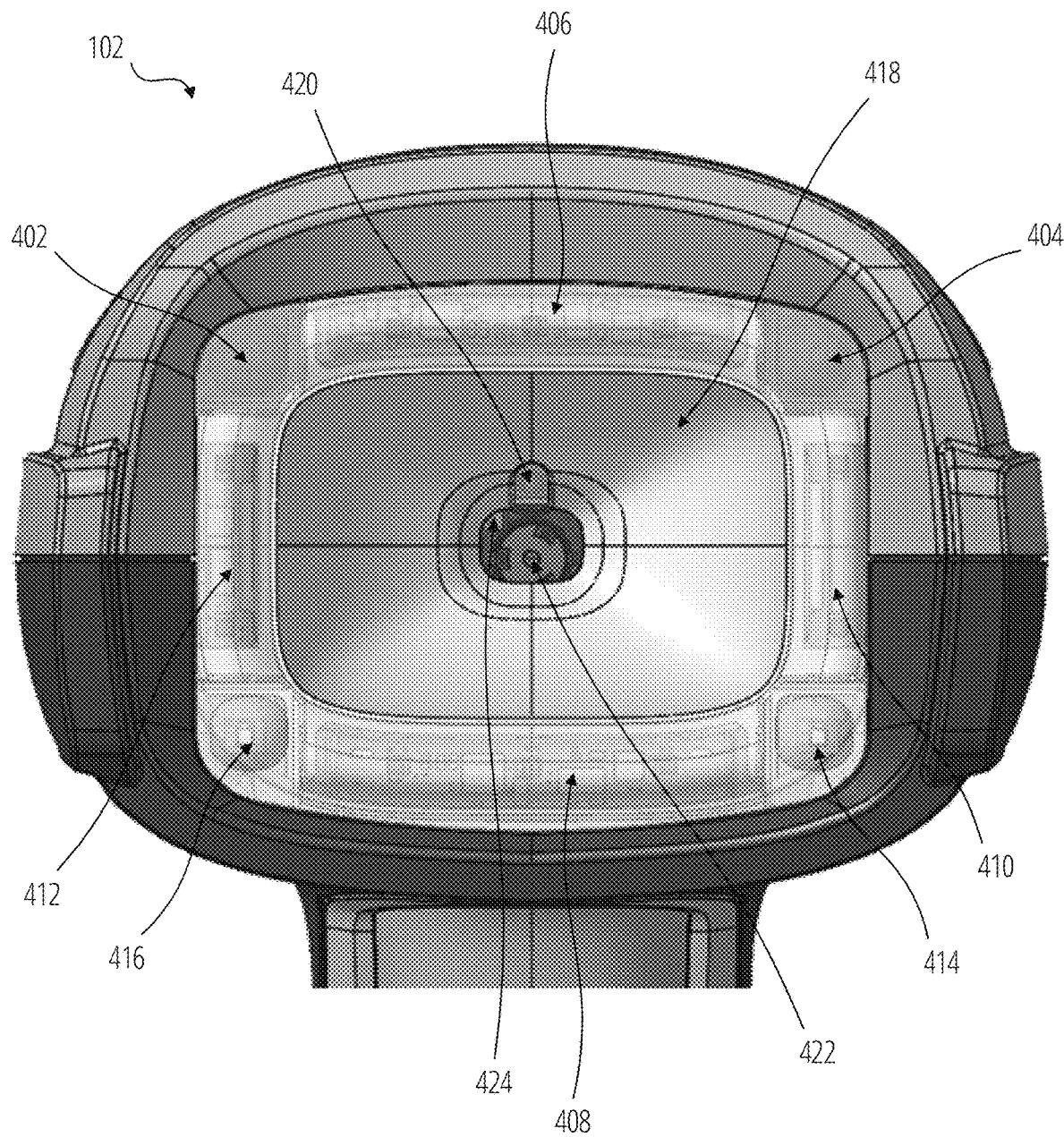
FIG. 4 illustrates a front view of an example improved reader in accordance with at least some example embodiments of the present disclosure.

FIG. 4 illustrates a front view of an example improved reader in accordance with at least some example embodiments of the present disclosure. Specifically, FIG. 4 illustrates a front view of the reader 102 while fully assembled. This view depicts an opening depicting the various components that are outward-facing, such that light may be produced via such components and/or light may flow in towards such components. It will be appreciated that the depiction of the reader 102 in FIG. 4 represents an assembled version of the exploded components depicted in FIG. 3.

As illustrated in FIG. 4, the reader 102 includes a ring illuminator assembly that comprises a plurality of illuminators surrounding an opening of the reader 102, for example where the opening is defined by a diffuser. As illustrated, the ring illuminator assembly includes a polarized illuminator 402 and a polarized illuminator 404. Each polarized illuminator produces a polarized illumination that illuminates one or more fields of view. In some embodiments, each polarized illuminator comprises a polarizer, at least one optical lens, and at least one polarized illuminator. It will be appreciated that in some embodiments, the reader 102 comprises a plurality of polarized illuminators located opposite one another over a particular axis, for example located across a z-axis (e.g., both located on top corners of the ring illuminator assembly).

The ring illuminator assembly further includes a narrow field illuminator 414 and narrow field illuminator 416. Each narrow field illuminator produces a concentrated illumination, which may have higher intensity than one or more other illuminators of the reader 102. In some embodiments, each narrow field illuminator comprises at least one optical lens and a narrow field illuminator (e.g., without a polarizer). In some embodiments, the illuminator(s) that generate the light associated with the narrow field illuminators 414 and 416 are the same as the illuminator(s) that generate the light associated with the polarized illuminators 402 and 404. It will be appreciated that in some embodiments, the reader 102 comprises a plurality of narrow field illuminators located opposite one another over a particular axis, for example located across a z-axis (e.g., both located on bottom corners of the ring illuminator assembly). The narrow field illuminators 414 and 416 may be positioned opposite the polarized illuminators 402 and 404, as depicted.

The ring illuminator assembly further includes a plurality of dark field illuminators positioned at edges of the ring. Specifically, the ring illuminator assembly includes dark field illuminator 406 positioned at a top edge of the ring formed by the ring illuminator assembly, dark field illuminator 408 positioned at a bottom edge of the ring formed by the ring illuminator assembly, dark field illuminator 410 positioned at a right edge of the ring formed by the ring illuminator assembly, and dark field illuminator 412 positioned at a left edge of the ring formed by the ring illuminator assembly. In some embodiments, the dark field illuminators 406-412 are each configured to produce the same or a similar illumination, such that the dark field illuminators in combination illuminate a field of view uniformly and at a high angle of incidence for a field of view near to the reader 102.

The reader 102 further includes a diffuser assembly 418. The diffuser assembly 418 is positioned behind the ring illuminator assembly, such that the opening defined by the ring of the ring illuminator assembly allows for a diffuse illumination to be produced towards one or more fields of view. For example, in some embodiments, the diffuser assembly 418 receives light from behind a diffuser and produces a uniform, scattered illumination from such light via the opening defined by the inside of the ring illuminator assembly. In some embodiments, the diffuser assembly 418 includes a narrower opening at the back of the diffuser assembly 418.

The reader 102 further includes a plurality of imagers. Each imager defines a field of view capturable by the imager. Specifically, the reader 102 includes a narrow field imager 420 defining a narrow field of view, and a wide field imager 422 defining a wide field of view. The wide field of view may be wider than the narrow field of view in one or a plurality of direction(s). As light reflects back into the opening defined by the ring illuminator assembly and through the opening defined by the back of the diffuser assembly 418, such light impacts or otherwise interacts with one of the imagers 420 or 422. In this regard, illuminations produced by any one or more of the illuminators 402, 404, 406, 408, 410, 412, 414, 416, and/or 418 may reflect off object(s) in the fields of view of the reader 102 (e.g., objects including code(s) to be scanned) and be captured by the imagers to generate illuminated images of such fields of view. In some embodiments, the narrow field imager 420 and wide field imager 422 are positioned in any orientation, for example with the narrow field imager 420 positioned above the wide field imager 422, or in other embodiments the wide field imager 422 is positioned above the narrow field imager 420.

The reader 102 further includes an aimer 424. The aimer 424 produces an aimer illumination that is output via the openings by the diffuser assembly 418 and the ring illuminator assembly. The aimer 424 includes at least an aimer illuminator and an aimer lens that produce the aimer illumination of a particular pattern. In some embodiments, as described herein, the aimer 424 includes one or more reflectors that redirect the aimer illumination in a near-coaxial direction with respect to central axes of the fields of view captured by the narrow field imager 420 and/or wide field imager 422. In some embodiments, the reflector and/or aimer illuminator of the aimer 424 is positioned such that the aimer illumination is produced with reduced offset from the viewing axis of the apparatus as defined by the imagers thereof. In this regard, in some embodiments a reflector is positioned next to the imagers 420 and 422 at a point most between said imagers. Such configurations are functional in circumstances where the size of the reader 102 prevents components from being positioned directly between the imagers 420 and 422 without offsetting the fields of view captured by such imagers by an unacceptable amount. In other embodiments where the size of the reader 102 is larger and minor offsets between such fields of view are allowable, the aimer illuminator and/or a reflector is/are positioned between the imager 420 and 422.

Figure 5:
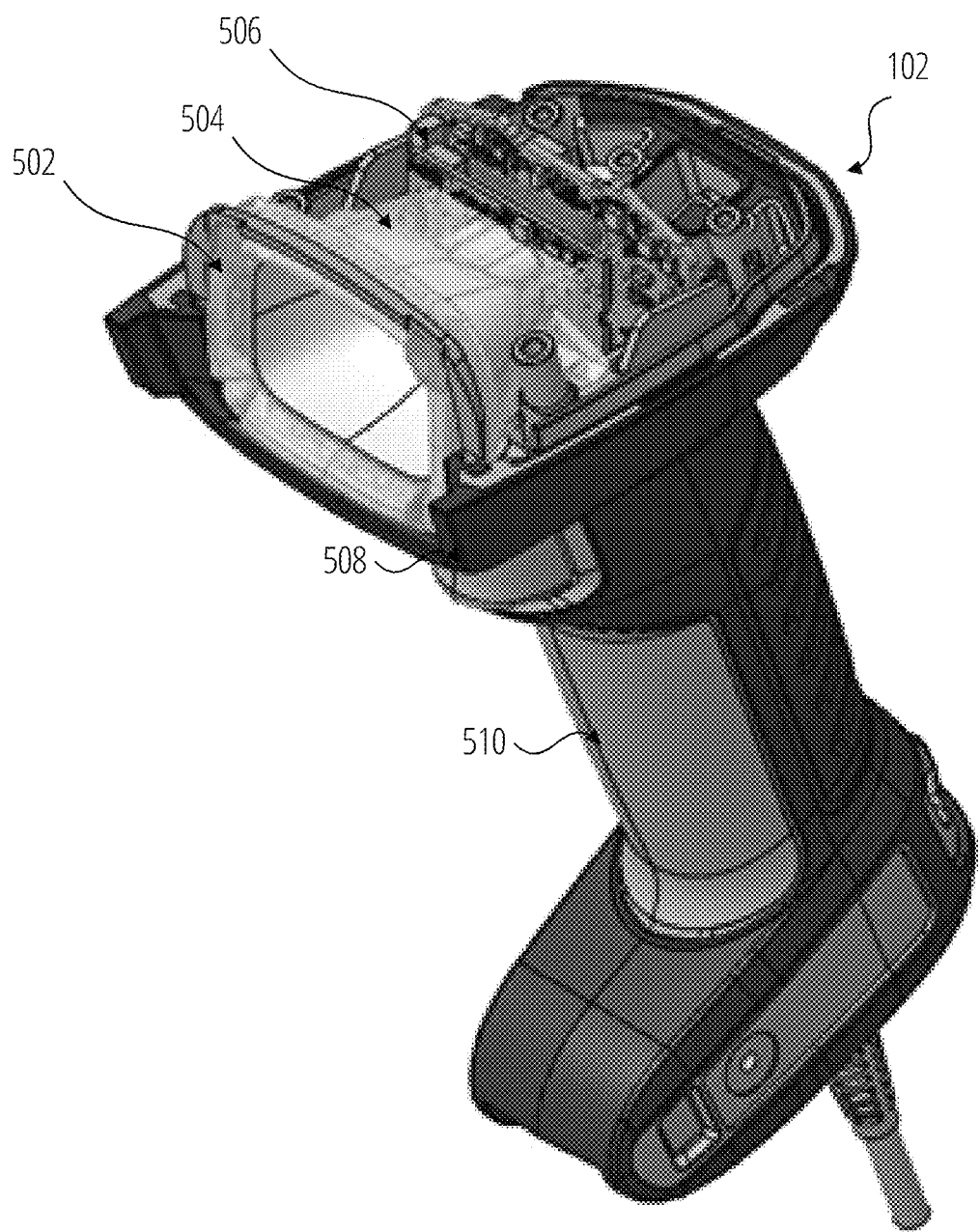
FIG. 5 illustrates an angled cutaway view of an example improved reader in accordance with at least some example embodiments of the present disclosure.

FIG. 5 illustrates an angled cutaway view of an example improved reader in accordance with at least some example embodiments of the present disclosure. Specifically, FIG. 5 illustrates a cutaway view of the assembled reader 102, depicting the various subassemblies therein. It will be appreciated that the subassemblies are depicted as each in a top portion (e.g., a header) of a handheld chassis, however in other embodiments the remaining portions of the chassis may embody a different design.

FIG. 5 depicts a ring illuminator assembly 502. The ring illuminator assembly 502 includes a plurality of illuminators, including illuminators of different types as described herein. For example, in some embodiments the ring illuminator assembly 502 includes a plurality of polarized illuminators, a plurality of narrow field illuminators, and a plurality of dark field illuminators, as described herein. The ring illuminator assembly 502 is positioned towards an opening of the reader 102, for example such that the illuminators of the ring illuminator assembly 502 are closest to the field of view capturable via imagers of the reader 102.

FIG. 5 further depicts a diffuser assembly 504. The diffuser assembly 504 is positioned behind the ring illuminator assembly 502, where the ring illuminator assembly 502 defines an inner ring representing an opening of the diffuser assembly 504. In some embodiments, the diffuser assembly 504 connects to the ring illuminator assembly 502 near the corners of the ring illuminator assembly 502. For example, in some embodiments the ring illuminator assembly 502 slots into place to fixedly connect to the diffuser assembly 504 in proper alignment.

The diffuser assembly 504 includes one or more components that produce a diffuse illumination. The diffuser assembly 504 for example produces a diffuse illumination in a forward-facing direction while similarly enabling incoming light to traverse through the reader 102 and interact with the imagers thereof. Such capabilities are provided with reduced additional space required by such components. For example, in some embodiments the diffuser assembly 504 includes a defined hole in such components (as depicted with respect to the diffuser 312, diffuser back light reflector 318, and board 320) to enable light to flow through the diffuser assembly 504 and interact with imagers positioned behind the diffuser assembly 504.

FIG. 5 further depicts a board assembly 506. The board assembly 506 is positioned behind the diffuser assembly 504. In some embodiments, the diffuser assembly 504 connects to the board assembly 506 at one or more defined points. In some embodiments, for example, a board of the diffuser assembly 504 connects to one or more components of the board assembly 506, such as a front of a lens assembly aligned with the image sensors of the reader 102. In this regard, light may flow through the ring illuminator assembly 502 and diffuser assembly 504 to interact with imagers of the board assembly 506, as described herein.

The board assembly 506 includes one or more imagers, each imager comprising an image sensor together with optical components that in combination define a particular field of view. In some embodiments, the board assembly 506 embodies a board together with a lens assembly that is affixed to, connected with, or otherwise oriented in alignment with the board to define such fields of view. For example, the lens assembly may include optical components associated with each imager on the board that defines the particular field of view capturable by that imager. The lens assembly includes a holder that positions these optical components in place, such that the optical components are properly aligned with their respective image sensor on the board. Additionally or alternatively, in some embodiments the lens assembly includes one or more reflectors that fold light produced by an aimer illuminator of the board assembly 506 towards a viewing axis of the apparatus. In some embodiments, the lens assembly is affixed to the board at defined points, for example where the board includes jut outs or particular components that snap into corresponding cavities of the lens assembly that receive the board. The board assembly 506 in some embodiments includes any of a number of other electrical components, for example a processor for controlling operation of the reader 102 as described herein, memory/memories, activation mechanism(s), and/or the like.

Each of the optical components fits into the top chassis 508 of the reader 102. In this regard, the required space to fit all components is reduced by enabling all components to be "sandwiched" together within a well-defined space, for example by layering the subassemblies comprising the plurality of illuminators. In some embodiments, the board assembly 506 extends at least in part into a bottom chassis 510, for example embodying the handle of the reader 102. In this regard, the non-optical and non-imaging components of the reader 102 may be positioned without impacting the size of the top chassis 508, enabling the complete apparatus to be designed with reduce space overall. Such components in the bottom chassis 510 may include the processor, trigger of the reader 102, and/or the like.

Figure 6A:
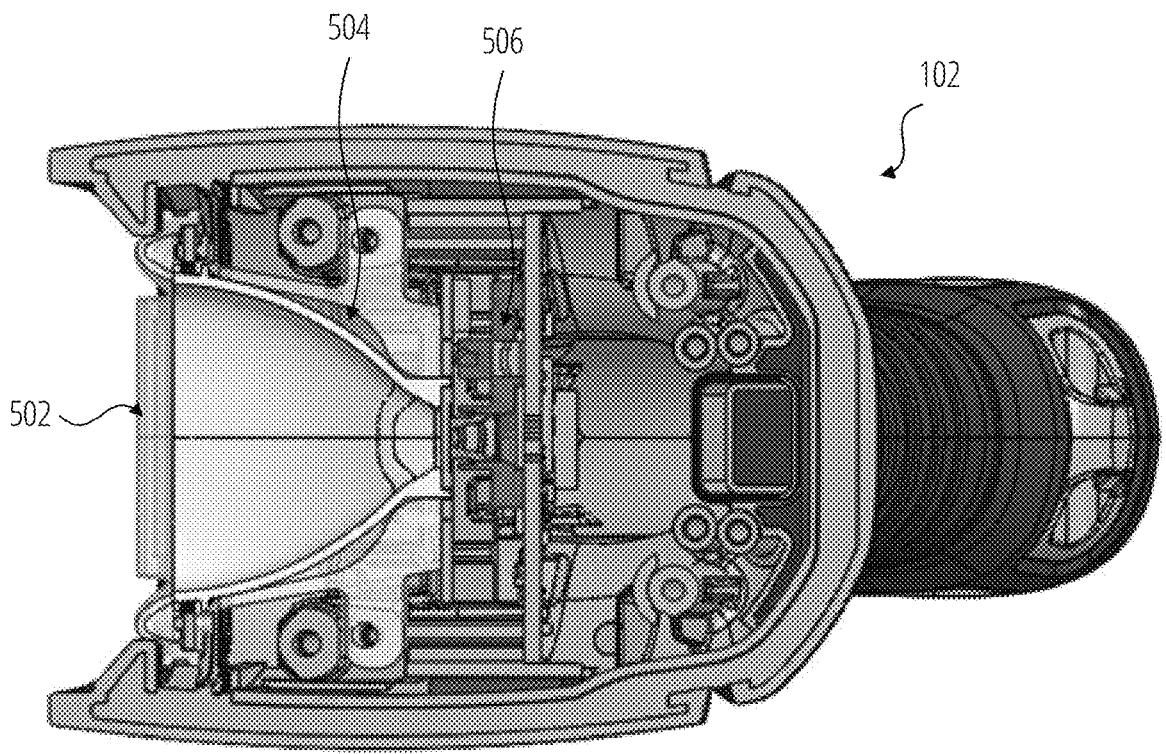
FIG. 6A illustrates a top-down cross-sectional view of an example improved reader in accordance with at least some example embodiments of the present disclosure.
Figure 6B:
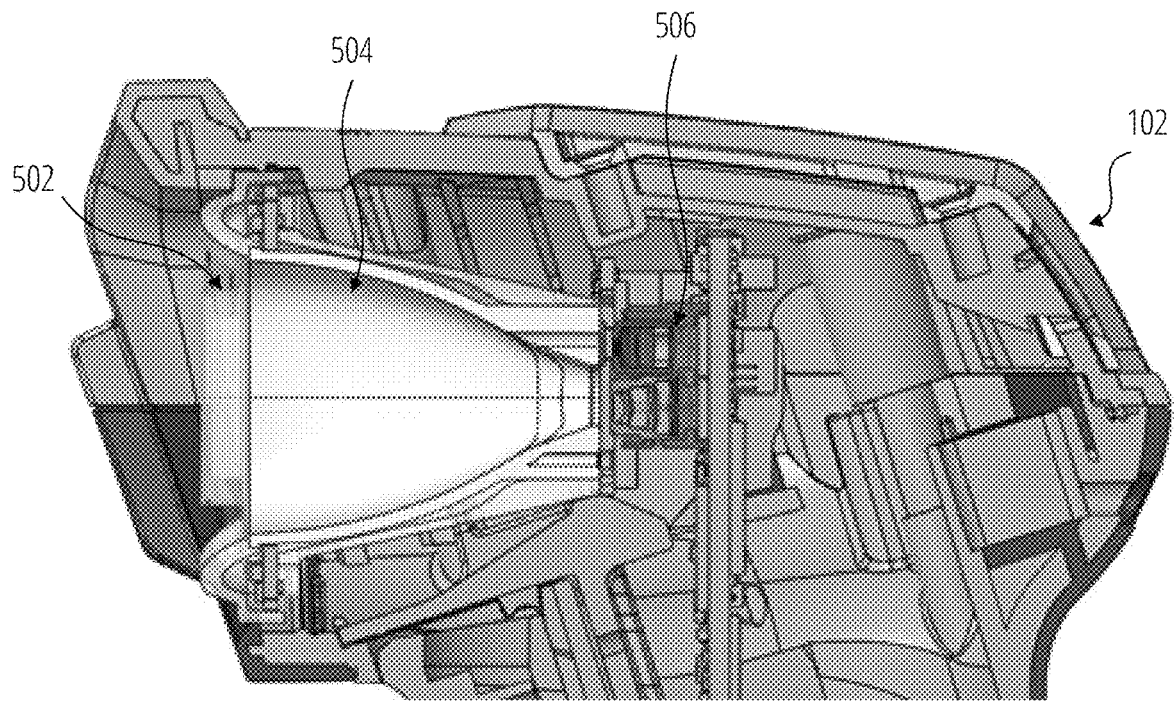
FIG. 6B illustrates a side cross-sectional view of an example improved reader in accordance with at least some example embodiments of the present disclosure.

FIG. 6A illustrates a top-down cross-sectional view of an example improved reader in accordance with at least some example embodiments of the present disclosure. Specifically, FIG. 6A depicts a top-down, cross-sectional view of the subassemblies ring illuminator assembly 502, diffuser assembly 504, and board assembly 506 positioned in alignment with one another within a chassis. Similarly, FIG. 6B illustrates a side cross-sectional view of an example improved reader in accordance with at least some example embodiments of the present disclosure. It will be appreciated that FIG. 6B depicts a side cross-sectional view of the same components within the reader 102.

The ring illuminator assembly 502 is positioned at a first, front position of the reader 102. The ring illuminator assembly 502 is secured at one or more corner(s) to the diffuser assembly 504. Additionally or alternatively, in some embodiments, the ring illuminator assembly 502 is prevented by an overhang or portion of the chassis of the reader 102 that prevents the ring illuminator assembly 502 from sliding forward and/or out of the reader 102.

In some embodiments, the diffuser assembly 504 is secured to the chassis of the reader 102. In some embodiments, the diffuser assembly 504 includes a back light illumination board including portion(s) that extend towards the edges of the reader 102. Such portion(s) may define portion(s) that receive securing mechanism(s) (e.g., fastener(s), nail(s), rivet(s), screw(s), and/or the like) to position the diffuser assembly 504 within the reader 102. In some embodiments, the diffuser assembly 504 is directly secured to the chassis of the reader 102 while the ring illuminator assembly 502 and diffuser assembly 504 are directly secured to the diffuser assembly 504 to be positioned in alignment.

In some embodiments, the board assembly 506 is secured to the diffuser assembly 504. For example, in some embodiments a board of the diffuser assembly 504 includes one or more cavities that receive a portion of the board assembly 506. For example, in some embodiments a component holder or lens assembly of the board assembly 506 includes one or more stud(s) that enter cavities or recessed areas of the diffuser assembly 504 to secure the board assembly 506 to the diffuser assembly 504. Alternatively or additionally, in some embodiments, the board assembly 506 is secured directly to the chassis of the reader 102, such that the board assembly 506 is positioned in alignment in the diffuser assembly 504 when secured to the chassis.

Figure 7A:
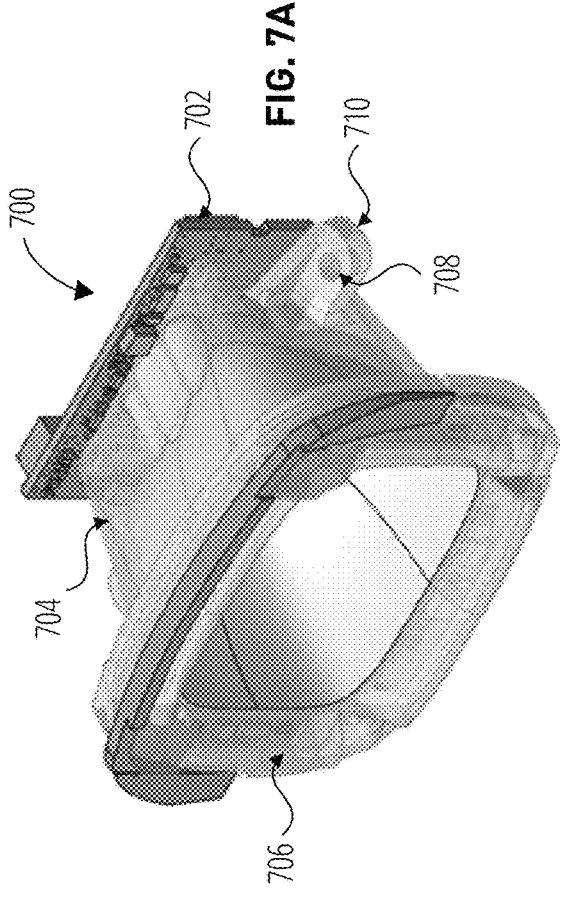
FIG. 7A illustrates a perspective view of an illuminator assembly including a ring illuminator assembly and a diffuser assembly in accordance with at least some example embodiments of the present disclosure.
Figure 7C:
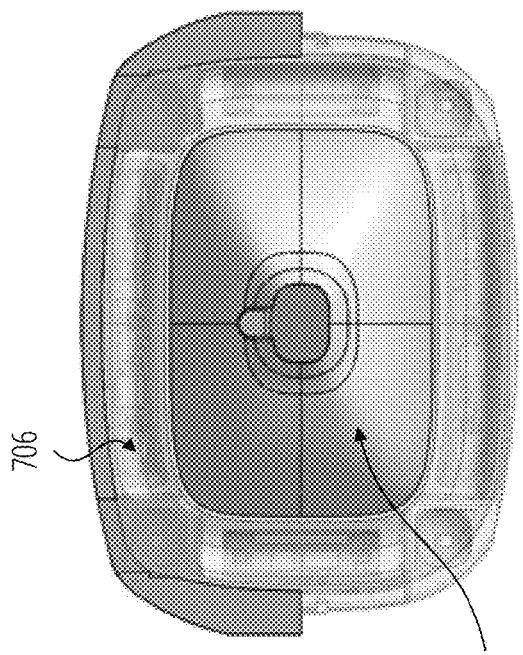
FIG. 7C illustrates a front view of an illuminator assembly including a ring illuminator assembly and a diffuser assembly in accordance with at least some example embodiments of the present disclosure.
Figure 7B:
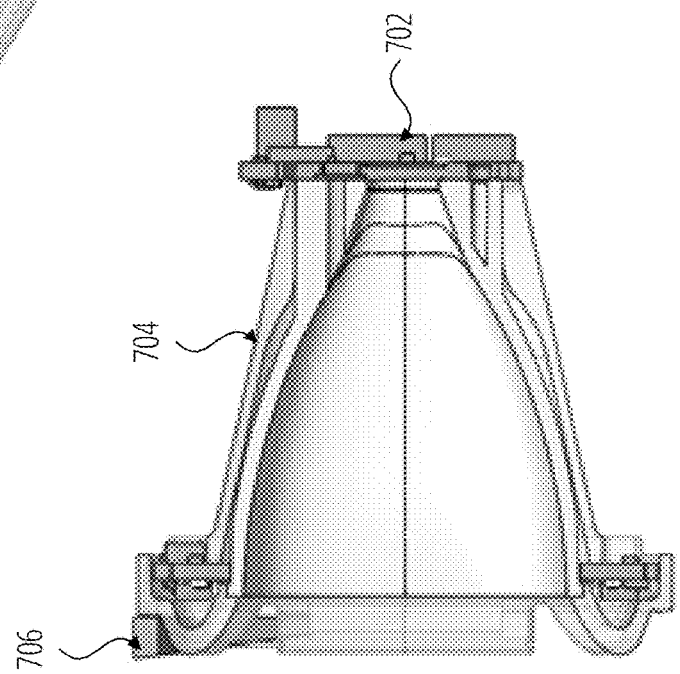
FIG. 7B illustrates a side cross-sectional view of an illuminator assembly including a ring illuminator assembly and a diffuser assembly in accordance with at least some example embodiments of the present disclosure.
Figure 7D:
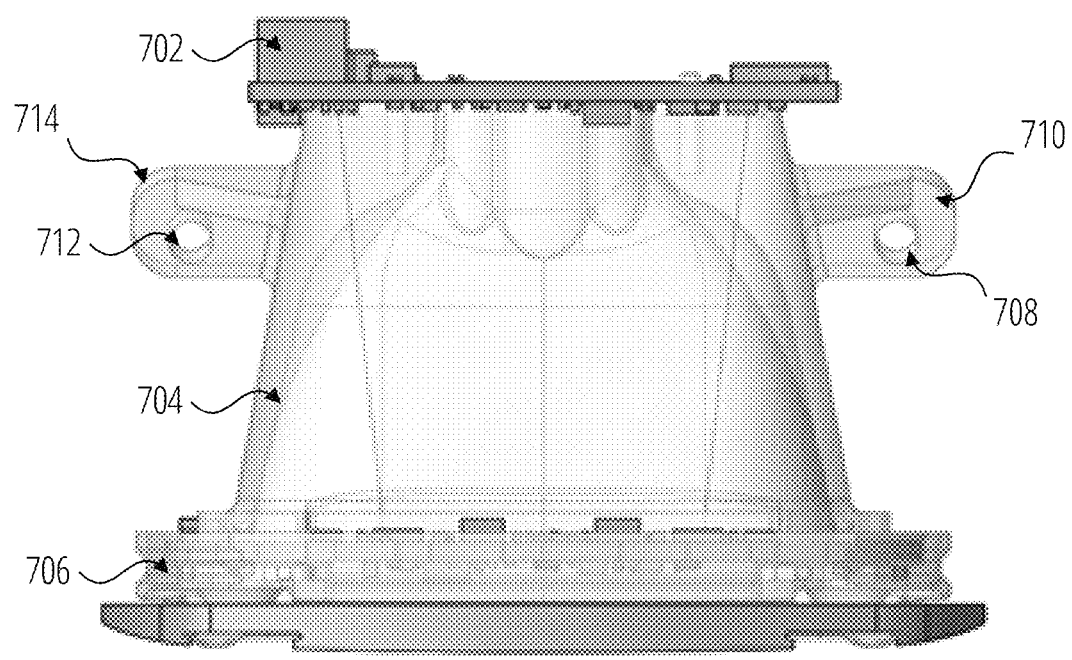
FIG. 7D illustrates a top-down view of an illuminator assembly including a ring illuminator assembly and a diffuser assembly in accordance with at least some example embodiments of the present disclosure.
Figure 7E:
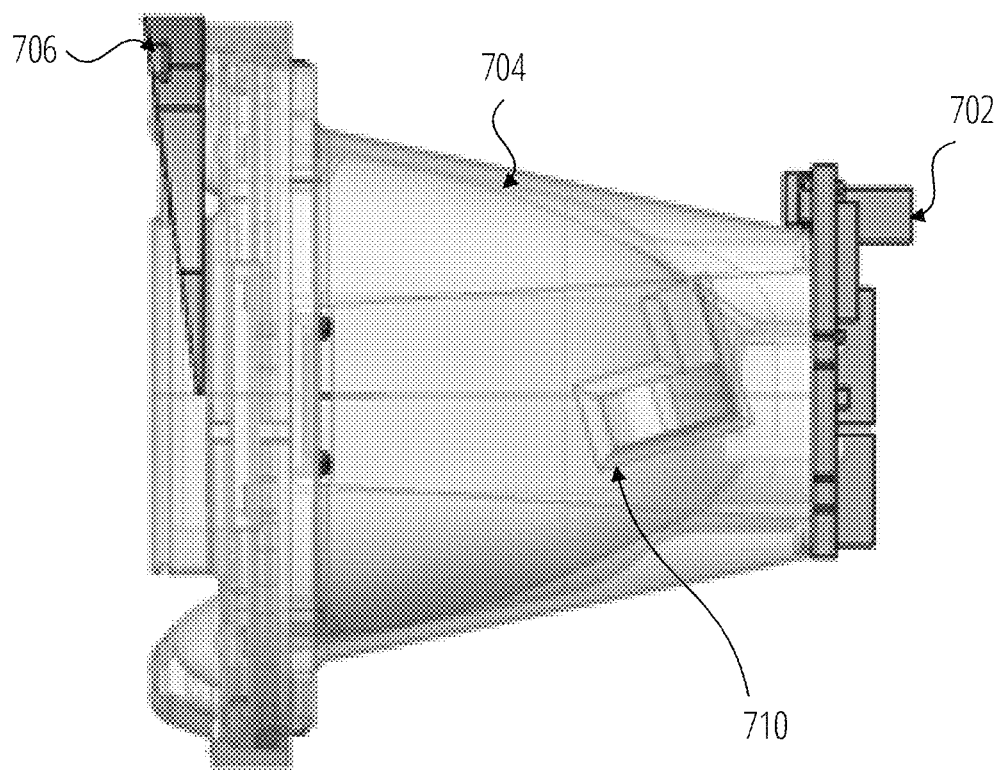
FIG. 7E illustrates a side view of an illuminator assembly including a ring illuminator assembly and a diffuser assembly in accordance with at least some example embodiments of the present disclosure.

FIG. 7A illustrates a perspective view of an illuminator assembly including a ring illuminator assembly and a diffuser assembly in accordance with at least some example embodiments of the present disclosure. FIG. 7B illustrates a side cross-sectional view of an illuminator assembly including a ring illuminator assembly and a diffuser assembly in accordance with at least some example embodiments of the present disclosure. FIG. 7C illustrates a front view of an illuminator assembly including a ring illuminator assembly and a diffuser assembly in accordance with at least some example embodiments of the present disclosure. FIG. 7D illustrates a top-down view of an illuminator assembly including a ring illuminator assembly and a diffuser assembly in accordance with at least some example embodiments of the present disclosure. FIG. 7E illustrates a side view of an illuminator assembly including a ring illuminator assembly and a diffuser assembly in accordance with at least some example embodiments of the present disclosure. Specifically FIG. 7A-FIG. 7E ("the illuminator assembly figures") depicts such views of an example illuminator assembly 700, for example embodying a specific example of a combining the ring illuminator assembly 502 and the diffuser assembly 504.

Specifically, the illuminator assembly figures depict the board 702 aligned with the diffuser and diffuser back light reflector of the diffuser assembly 704. In this regard, as described herein, the diffuser back light reflector in some embodiments is in alignment with one or more illuminators of the board 702 to enable light to be produced through the back light illumination board. In some embodiments, the board 702 includes a defined hole in the center that enables light to pass to and/or from the diffuser assembly 704. In some embodiments, the board 702 is secured to the diffuser assembly 704, for example via the diffuser back light reflector, at the border of the hole defined in the board 702.

Similarly, the illuminator assembly figures depict the polarized illuminator assembly 706 aligned with the diffuser and diffuser back light reflector of the diffuser assembly 704. In this regard, as described herein, the polarized illuminator assembly 706 defines a ring that enables light to pass to and/or from the front of the diffuser assembly 704. In some embodiments, the polarized illuminator assembly 706 is secured to the diffuser assembly 704, for example via the front of the diffuser back light reflector, at the border of the front hole opening defined by the ring of the polarized illuminator assembly 706.

The diffuser assembly 704 includes a plurality of portions for securing the illuminator assembly 700 the position of the illuminator assembly 700, for example to a chassis of an apparatus (e.g., the reader 102). Specifically, the diffuser assembly 704 includes two securing wings, specifically securing wing 710 and securing wing 714 positioned at opposite sides of the diffuser assembly 704. In some embodiments, the securing wings 710 and 714 each are embodied by a portion of a diffuser back light reflector extended outward from opposite sides of the diffuser. In some embodiments, the securing wings 710 and 714 are molded into the diffuser back light reflector. In some embodiments, the securing wings 710 and 714 each embody separate components fixedly secured to the diffuser back light reflector at determinable positions via separate securing mechanism(s).

In some embodiments, the securing wings each include particular elements that enable positioning of the illuminator assembly 700 within an apparatus. For example, as illustrated, the securing wings 710 and 714 each include a securing cavity, specifically securing cavity 708 and securing cavity 712. The securing cavities 708 and 712 each define a particular hole in the securing wing that receives a securing mechanism or element that positions the illuminator assembly 700 and/or prevents it from significantly moving, reorienting, rotating, or otherwise being manipulated out of alignment. For example, in some embodiments, the securing cavity 708 receives a first defined portion of a chassis of an apparatus, and the securing cavity 712 receives a second defined portion of the chassis of the apparatus, such that the illuminator assembly 700 remains in a fixed position, fixed alignment, and/or fixed orientation when the chassis portions are engaged with the securing cavities 708 and 712. It will be appreciated that the securing wings 710 and 714 may be out of the way of the imaging, optical, and/or illuminator components of the illuminator assembly 700. In some embodiments, the securing wings 710 and 714 are of reduced size, such that the securing wings are only as large in one or more directions as necessary to ensure the structural integrity of the securing wings, and/or to position the corresponding securing cavities at one or more particular position(s) within a particular apparatus chassis.

Figure 8:
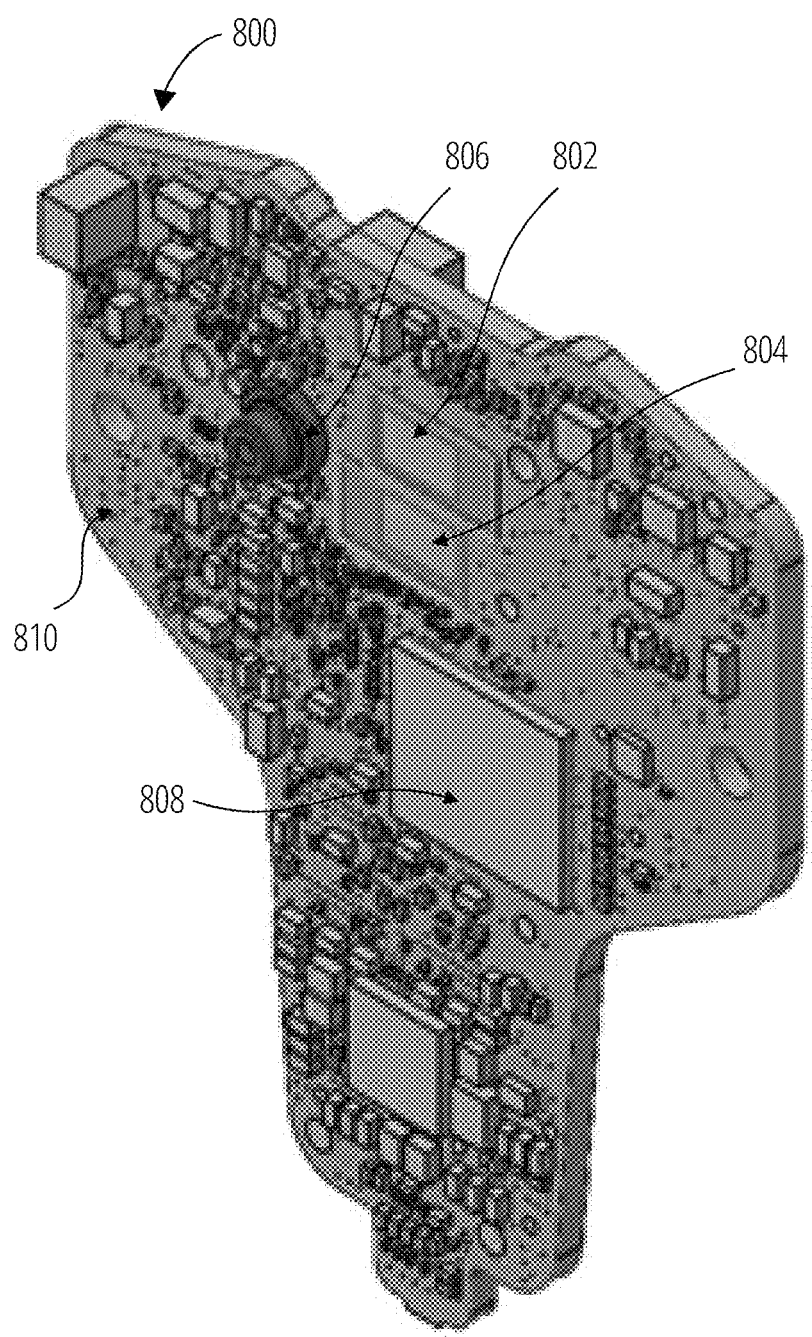
FIG. 8 illustrates a perspective view of an example imager board in accordance with at least some example embodiments of the present disclosure.

FIG. 8 illustrates a perspective view of an example imager board in accordance with at least some example embodiments of the present disclosure. Specifically, FIG. 8 depicts an example board 800 embodying an imager board. The board 800 facilitates capture of one or more images and/or processing of such image(s), for example to detect code(s) (e.g., machine readable symbologies) represented in such image(s) and/or decode such code(s) upon detecting such code(s). In some embodiments, the board 800 embodies a particular implementation of the board 332 within an example apparatus, such as the reader 102.

The board 800 includes a plurality of imagers. Specifically, the board 800 includes image sensor 802 and image sensor 804. In some embodiments, the image sensors are associated with differing field of views, for example defined by configuration(s) of the image sensors themselves and/or associated optical components. In some embodiments for example, the image sensor 802 embodies a narrow field image sensor that captures image representations of a narrow field of view, while the image sensor 804 embodies a wide field image sensor that captures image representations of a wide field of view, the wide field of view wider than the narrow field of view in at least one direction. In some other embodiments, the image sensor 802 embodies a wide field image sensor, while the image sensor 804 embodies a narrow field image sensor. In some embodiments, the image sensors 802 and image sensor 804 are embodied by the same type and/or configuration of image sensor. Alternatively or additionally, in some embodiments, the type and/or configuration of the image sensor 802 differs from the type and/or configuration of the image sensor 804. Each of the image sensors 802 and 804 are communicatively coupled with circuitry of the board 800, for example a circuitry board 810 embodied by a printed circuit board, that enables output and transmission of the images captured by the image sensors 802 and 804 to one or more other components of the board 800.

The board 800 further includes a processor 808. In some embodiments, the processor 808 is embodied by a microprocessor, single core processor, multi-core processor, ASIC, and/or the like, communicatively coupled with circuitry of the board 800, for example circuitry board 810 embodied by a printed circuitry board, to enable communication with one or more other component(s) of the board 800. In some embodiments, the processor 808 is configured to perform software instruction(s), perform one or more particular algorithm(s), and/or the like, that enables operation of a particular apparatus (e.g., the reader 102) via the various components thereof. For example, in some embodiments, the processor 808 activates one or more illuminator(s) of an apparatus, such as the reader 102, to illuminate a field of view, and activates the image sensors 802 and/or 804 to capture one or more image representation(s) of the field of view via the image sensors image sensor 802 and/or image sensor 804, and/or facilitates transmission of captured image representations to the processor 808 and/or other components for further processing. Additionally or alternatively, in some embodiments, the processor 808 processes captured image representations of one or more field of view(s) to detect and/or decode one or more machine-readable symbologies embodied in code(s) captured within the image representations, and determine whether such a code was detected and/or decoded successfully (e.g., indicating successful completion of a scanning operation).

In some embodiments, the board 800 includes an aimer illuminator 806 that outputs a light utilized to produce an aimer illumination of a particular pattern. In some embodiments, the aimer illuminator 806 is communicatively coupled with the processor 808, for example via the circuitry board 810 embodying a printed circuitry board, to enable the processor 808 to control activation of the aimer illuminator 806.

In some embodiments, the board 800 and/or one or more associated boards with which the board 800 is communicably coupled (e.g., a board associated with a ring illuminator assembly and/or a board associated with a diffuser assembly) includes one or more additional components that control and/or facilitate functioning of the reader 102. For example, in some embodiments, the board 800 includes power management circuitry. Additionally or alternatively, in some embodiments, the board 800 includes communication circuitry (e.g., that enables data output and/or intake). Additionally or alternatively, in some embodiments, the board 800 includes input/output circuitry and/or interfacing circuitry (e.g., that enables receiving of input and/or output of data via one or more sensory elements, such as a visual interface, light(s), speaker(s) for audio output, and/or the like).

Figure 9:
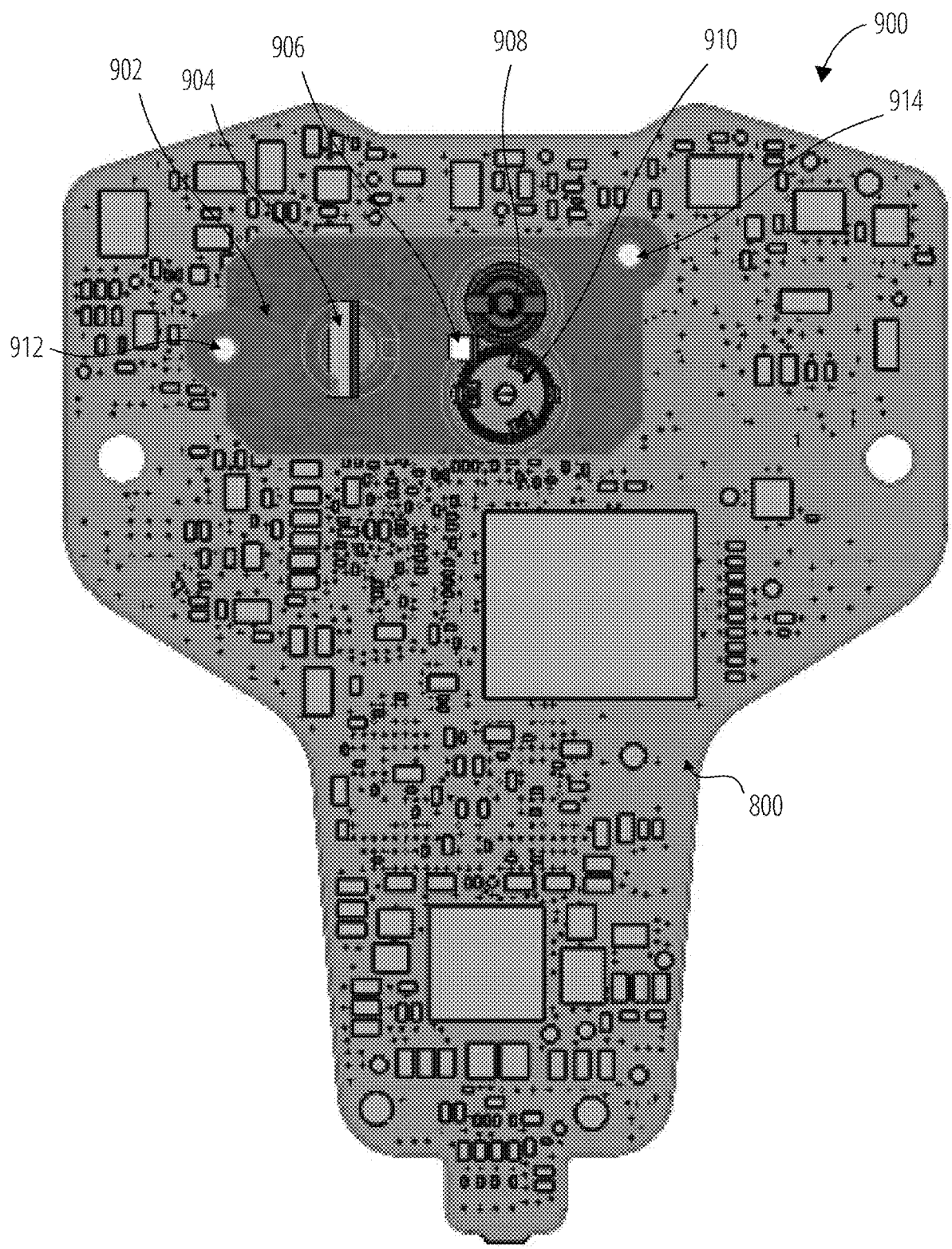
FIG. 9 illustrates a front view of an assembled board including a lens assembly in accordance with at least some example embodiments of the present disclosure.

In some embodiments, the board 800 is positioned in alignment with one or more optical component(s) (e.g., lenses, reflectors, refractive elements, and/or the like) that manipulate light generated by one or more component(s) and/or light flowing towards one or more component(s). FIG. 9 illustrates a front view of an assembled board including a lens assembly in accordance with at least some example embodiments of the present disclosure. Specifically, FIG. 9 depicts a lens assembly fixedly secured to the board 800, forming an assembled board 900. It will be appreciated that, in other embodiments, the lens assembly is fixedly secured to the board 800 in alternative orientation(s) and/or utilizing alternative mechanism(s), for example so long as the lens assembly align(s) one or more component(s) to enable operation of the corresponding components (e.g., to define one or more desired field(s) of view, output one or more particular illuminations to said field(s) of view, and/or the like).

As illustrated, the assembled board 900 includes a holder 902 that secures various components in particular positions. For example, the holder 902 includes defined positions for a reflector 904, reflector 906, imager lens 908, and imager lens 910. In this regard, the position at which each component of the holder 902 is secured (e.g., via a cavity of a defined shape and/or size where the component is received to fit, snap, or otherwise secure into place) is intended to be in alignment with an associated component of the board 800. In some embodiments, the holder 902 is secured to the board 800 to ensure that such associated components remain in alignment. For example, in some embodiments, the holder 902 includes one or more securing points, such as the securing point 912 and the securing point 914, that fixedly secures the holder 902 to the 800. In this regard, the securing points prevent the holder 902 and components secured thereto from misaligning with the associated components of the board 800. In some embodiments, one or more of the securing point(s) defines a hole that receives a defined component (e.g., a stud) of the board 800. Alternatively or additionally, in some embodiments one or more of the securing point(s) defines a stud that engages a defined cavity or hole in board 800. It will be appreciated that the holder 902 may be secured via any number of securing points positioned at various positions to prevent shifting, rotation, or other misalignment of the holder 902 from the underlying board 800.

The holder 902 includes reflector 904 in alignment with the aimer illuminator 806 of the board 800. In this regard, the aimer illuminator 806 outputs light that impacts the reflector 904. In some embodiments, the reflector 904 embodies an aimer folding reflector that folds the outputted light in a particular direction, for example towards a center of the apparatus. As illustrated for example, the reflector 904 reflects the outputted light from the aimer illuminator 806 in a ninety degree rotation towards the image sensors of the board 800. The reflector 904 specifically reflects the outputted light in alignment with a second reflector, specifically reflector 906. In some embodiments, the reflector 906 embodies a second aimer folding reflector that folds the reflected light in a second particular direction, for example towards a viewing axis of the apparatus. In this regard, the aimer folding reflectors embodied by reflector 906 and 904 enable the light produced by the aimer illuminator 806 to be folded closer to the image sensors 802 and 804 of the board 800 despite the larger size of the aimer illuminator 806 preventing it from being positioned at such a position with respect to the image sensors 802 and 804. Such close alignment of the image sensors 802 and 804 together with the folded light reflected via the reflectors 904 and 906 enables the aimer illumination produced via such folded light to be positioned in better alignment with the fields of view captured by the image sensors 802 and/or 804.

The holder 902 further includes imager lens 908 in alignment with image sensor 802 of the board 800. In this regard, the imager lens 908 manipulates light that flows towards and ultimately impacts the image sensor 802. In some embodiments, the imager lens 908 is configured to define a particular field of view that is capturable by the image sensor 802, for example based at least in part on the lens shape, focal length, and/or the like. The holder 902 similarly includes imager lens 910 in alignment with image sensor 804 of the board 800. In this regard, the imager lens 908 manipulates light that flows towards and ultimately impacts image sensor 804. In some embodiments, the imager lens 910 is configured to define a second particular field of view that is capturable by the image sensor 804, for example based at least in part on the lens shape, focal length, and/or the like.

In this regard, the imager lens 908 and the imager lens 910 may be configured differently to define different fields of view. For example, in some embodiments, the imager lens 908 defines a first field of view, which has particular dimensions in two dimensions and varying focus in a third dimension, and the imager lens 910 defines a second, wider field of view that is larger in at least one dimension (e.g., the first field of view embodying a narrow field of view, and the second field of view embodying a wide field of view). In some such embodiments, the narrow field of view may be associated with a focal point at a further distance than the corresponding wide field of view. In this regard, by utilizing a plurality of fields of view, embodiments enable improved likelihood of a captured image being sufficiently clear to enable detection and decoding of a machine-readable symbology captured therein (e.g., a captured code). In some embodiments, the imager lens 908 defines the wide field of view, and the imager lens 910 defines the narrow field of view.

In some embodiments, the holder 902 is secured to the board, for example the board 800 as described herein, at a particular position such that the corresponding imager components (e.g., lenses and image sensors) remain in alignment with reduced extra components. In this regard, in some such embodiments, even in circumstances where the position of the assembled board 900 shifts by any amount, such imager components may remain in alignment. It will be appreciated that in some other embodiments, the holder 902 may be secured to the chassis of an apparatus. In this regard, the chassis of the apparatus may include one or more alignment features that maintain the relative alignment between the imager components (e.g., the lenses and the corresponding image sensors). Such alignment features and/or additional securing mechanisms may similarly maintain the position of the assembled board 900, and/or the holder 902 and board 800 individually, within the apparatus (e.g., the reader 102).

Figure 10:
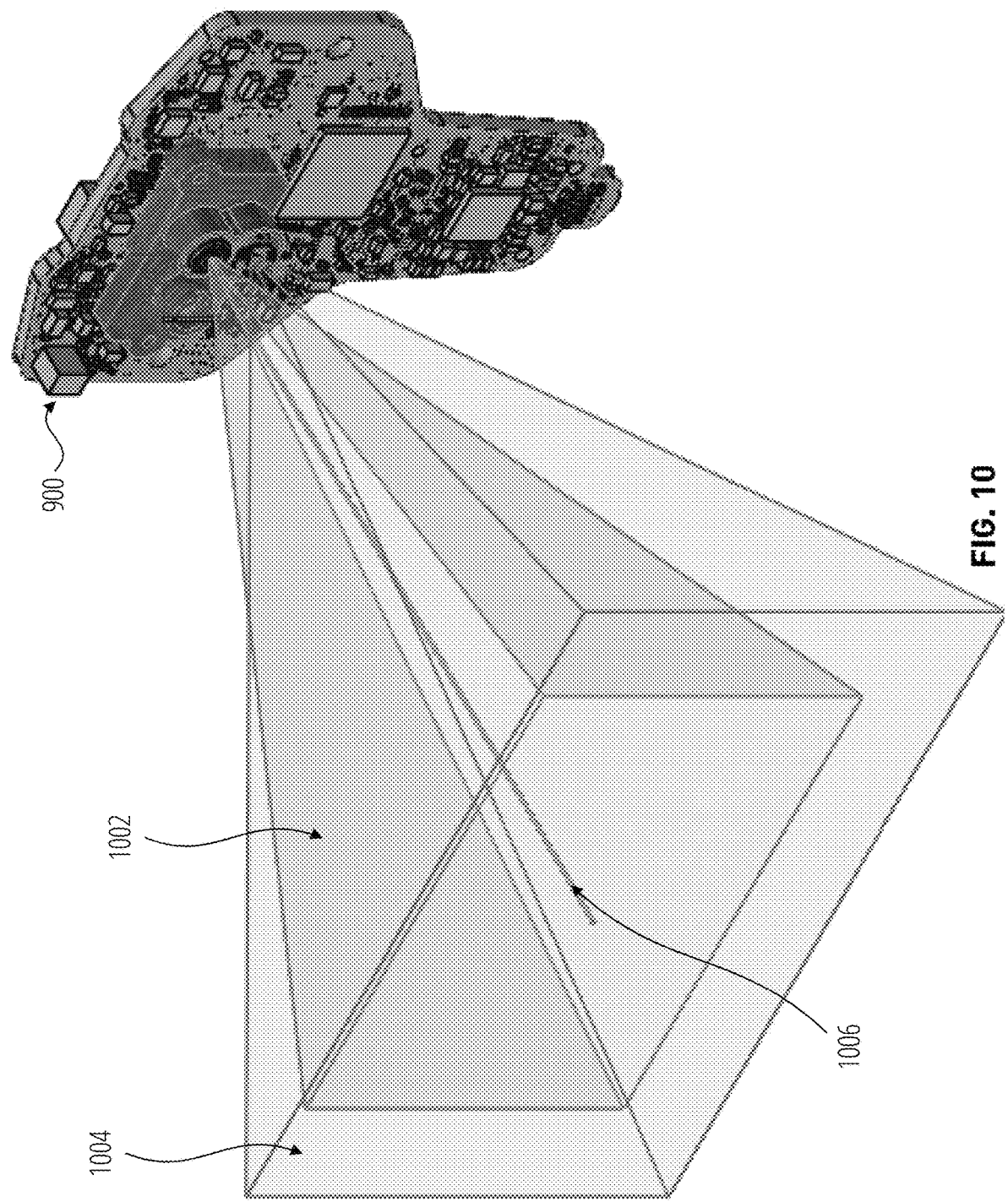
FIG. 10 illustrates exemplary fields of view capturable via an improved reader in accordance with at least some example embodiments of the present disclosure.

FIG. 10 illustrates exemplary fields of view capturable via an improved reader in accordance with at least some example embodiments of the present disclosure. For example, FIG. 10 illustrates example fields of view capturable via the assembled board 900 as described herein. Specifically, FIG. 10 illustrates a first field of view 1002 and second field of view 1004 capturable via the assembled board 900, for example of an example reader 102. In some embodiments the image sensors of the assembled board 900 are configured to capture image representations of their respective field of view simultaneously. In other embodiments, the image sensors of the assembled board 900 are configured to capture image representations of their respective field of view in an alternate manner, such that one of the image sensors is activated at a given time.

In some embodiments, the fields of view 1002 and 1004 are offset and co-axial or near-co-axial (e.g., within an acceptable threshold). In this regard, in some embodiments, the fields of view 1002 and 1004 overlap at least in part, such that objects at a particular distance from the associated reader (e.g., the reader 102 including the assembled board 900) are likely to be visible to both imagers. For example, in some embodiments, the field of view 1002 is offset vertically by the radius of each image sensor 802 and 804 from the field of view 1004. Each field of view may be slightly oriented towards a central viewing axis of the apparatus between the image sensors.

It will be appreciated that the focus at various points in the fields of view 1002 and 1004 may differ. For example, in some embodiments, the narrow field imager associated with the field of view 1002 may have a further focal distance than the corresponding wide field imager associated with the field of view 1004, such that objects are in better focus for the wide field imager at a close range as opposed to in better focus for the narrow field imager at a further range. Similarly, the fields of view 1002 and 1004 may be affected differently by illuminations produced via the apparatus, for example the reader 102 associated with the assembled board 900. In this regard, the dual-imager capabilities of the assembled board 900 enable improved likelihood of capturing an image representation of an object that is sufficiently in focus to enable the images to be processed successfully (e.g., to detect and decode a particular code).

FIG. 10 further illustrates an aimer illumination 1006 within such fields of view. In some embodiments, the aimer illumination is output by an aimer illuminator of the assembled board 900 and folded towards image sensors associated with the fields of view 1002 and 1004, then folded in a forward-facing direction corresponding to the viewing axis of the apparatus such that the aimer illumination is co-axial or near-co-axial (e.g., within a determinable offset tolerance) of the viewing axis of the apparatus. In this regard, the aimer illumination 1006 is produced at a position sufficiently central to each of the fields of view 1002 and 1004.

In some embodiments, the assembled board 900 is configured utilizing one or more imagers to capture any number of alternatively configured fields of view. For example, as illustrated and described above, the assembled board 900 in some embodiments includes two image sensors, each in alignment with a lens to capture a particular field of view (e.g., a first field of view embodying a wide field of view and a second field of view embodying a narrow field of view). In some other embodiments, the assembled board 900 includes one image sensor in alignment with a single lens to capture a particular single field of view. In some other embodiments, the assembled board 900 includes three or more image sensors, each in alignment with its own lens to enable capture of three different fields of view. In some such embodiments, an aimer may be relatively centrally aligned to the plurality of imagers in the apparatus.

Example Processes of the Disclosure

Having described example systems, apparatuses, computing environments, interfaces, and data visualizations of the disclosure, example processes in accordance with the present disclosure will now be described. It will be appreciated that each of the flowcharts depicts an example computer-implemented process that is performable by one or more of the apparatuses, systems, devices, and/or computer program products described herein, for example utilizing one or more of the specially configured components thereof. For example, in some embodiments, the reader 102 performs the process(es) described herein utilizing one or more memory/memories and/or processor(s) as described herein.

In some embodiments, the process(es) described herein provide for improved operation of the improved reader(s) described herein. For example, the process(es) may be utilized to improve the likelihood that an initiated scanning operation is performed successfully (e.g., by activating one or more particular component(s) that maximize the likelihood that a captured image includes a detectable and decodable representation of a code). In this regard, in some embodiments the process(es) describe operations for controlling a reader, such as the reader 102, in a particular manner. In some other embodiments, the reader 102 is controlled utilizing one or more other process(es), for example that utilize a pre-determined or defined algorithm for activating component(s) thereof based on a selected operational mode, previously stored historical data, and/or the like.

The blocks depicted indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 11:
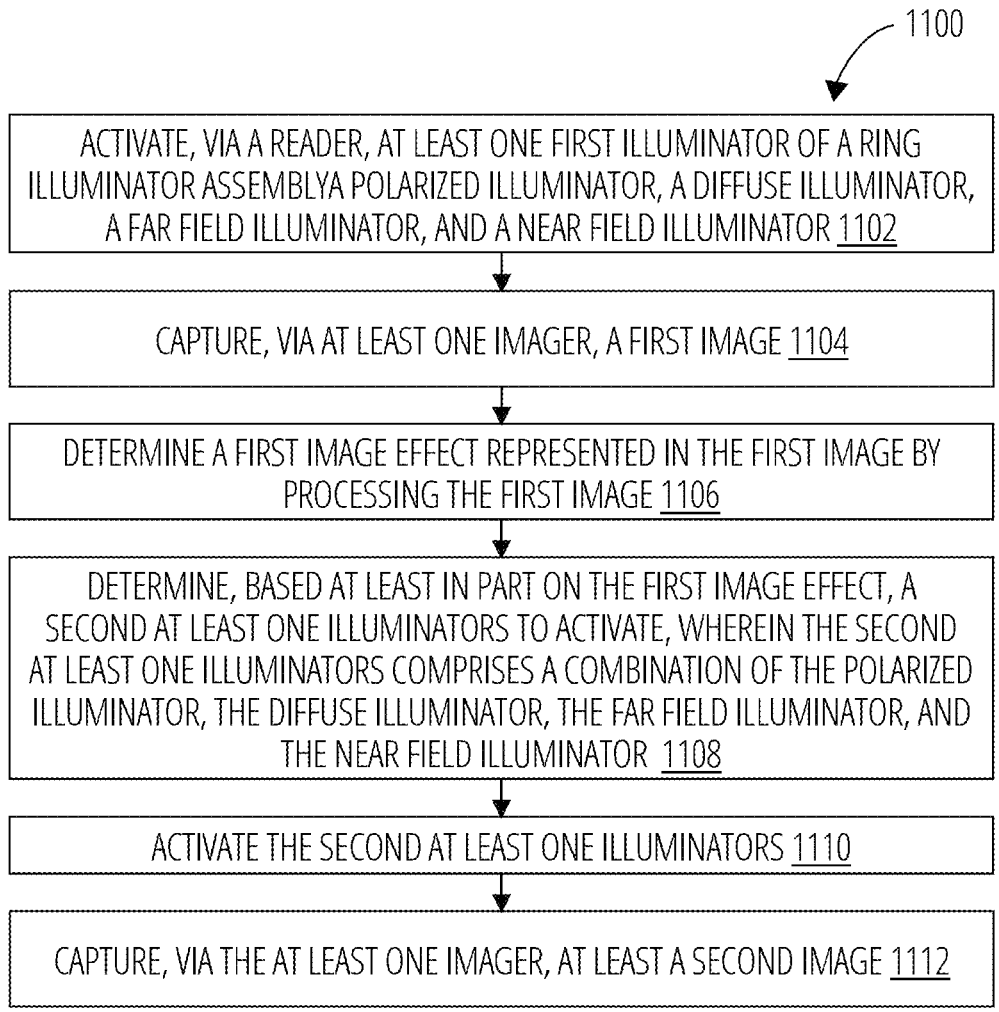
FIG. 11 illustrates a flowchart depicting example operations of an example improved process for using an improved reader in accordance with at least some example embodiments of the present disclosure.

FIG. 11 illustrates a flowchart depicting example operations of an example improved process for using an improved reader in accordance with at least some example embodiments of the present disclosure. Specifically, FIG. 11 depicts example operations of an example process 1100. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the reader 102 embodied by the apparatus 200 alone or in communication with one or more other component(s), device(s), system(s), and/or the like. In this regard, the reader 102 is specially configured by computer-coded instructions (e.g., computer program instructions) stored thereon, for example in the memory 204 and/or another component as depicted and/or described, for performing the operations as depicted and described in FIG. 11.

In operation 1102, process 1100 activates, via a reader, at least one first illuminator of a ring illuminator assembly. The ring illuminator assembly may include at least one of a polarized illuminator, a diffuse illuminator, a narrow field illuminator, and/or a near field illuminator. The reader may activate a single illuminator, or a plurality of illuminators of a single type or various types. In some embodiments, the reader predetermines which at least one first illuminator to activate. In some embodiments, the reader determines which at least one first illuminator to activate based at least in part on one or more software-driven determination(s). For example, in some embodiments, the reader 102 utilizes data associated with one or more previously initiated scanning operations (e.g., iterations of a process to capture and attempt processing of one or more images) to determine which illuminators may be activated to result in the highest probability of capturing an image illuminated in a manner that may be processed successfully. In some embodiments, the reader 102 stores data associated with previous scanning operations initiated until previously being powered down, such as data indicating which illuminators were activated and whether resulting images were successfully processed for a current task or relevant period of time. Alternatively or additionally, in some embodiments, the reader 102 stores data associated with previous scanning operations initiated for a particular time range.

In operation 1104, process 1100 captures, via at least one imager, a first image. In some embodiments, the at least one imager includes a wide field imager and a narrow field imager. In some other embodiments, the at least one imager includes a single image, or includes three or more imagers each associated with a different capturable field of view. In some embodiments, the reader determines whether to capture via the wide field imager or via the narrow field imager based at least in part on data indicating which imager was more successful in previous scanning operations. In some embodiments, the reader captures an image via the wide field imager and a second image via the narrow field imager, such that both or either image may be further processed.

In operation 1106, process 1100 determines a first image effect represented in the first image by processing the first image. In some embodiments, a processor of the reader receives the first image and processes it utilizing one or more image processing algorithm(s). The image processing algorithm(s) may determine a darkness level of the captured image, a light uniformity of the captured image, detect specular reflection above a particular threshold from the captured image, and/or the like. In this regard, it will be appreciated that the reader may be specially configured to enable detection of any of a myriad of visual effects in the image that may prevent or negatively impact the ability for the image to be successfully processed (e.g., for accurate detection and/or accurate decoding of a code embodying a particular machine-readable symbology).

In operation 1108, process 1100 determines, based at least in part on the first image effect, a second at least one illuminators to activate, wherein the second at least one illuminators comprises a combination of the polarized illuminator, the diffuse illuminator, the narrow field illuminator, and the near field illuminator. For example, in some embodiments, the reader 102 maintains a lookup table that correlates image effects with corresponding illuminators that should be activated instead to reduce or eliminate the image effect. Alternatively or additionally, for example, in some embodiments the reader 102 utilizes a machine learning model, AI, or other model that is trained to process incoming data signals (e.g., data indicating the activated illuminators for the first image, the image effect, the first image, and/or the like) and outputs corresponding data indicating the second at least one illuminator to activate. In some embodiments, the reader determines a second at least one illuminators that reduce or eliminate the first image effect. It will be appreciated that, in some embodiments, the second at least one illuminators may include one or more additional or alternative illuminators from the at least one first illuminator, or an entirely different set of illuminator(s).

In operation 1110, process 1100 activates the second at least one illuminators. In this regard, the second at least one illuminators each produce an illumination that is utilized to illuminate one or more field(s) of view capturable via the reader. In some embodiments, the second at least one illuminators may differ by at least one additionally activated or deactivated illuminator from the at least one first illuminator.

In operation 1112, process 1100 captures, via the at least one imager, at least a second image. In some embodiments, the same imager utilized to capture the first image is similarly utilized to capture the second image. Alternatively or additionally, in some embodiments, the reader determines whether to utilize the same imager or a different imager to capture the second imager. For example, in some embodiments, the reader determines whether to utilize the same imager of a wide field imager or a narrow field imager to capture the second image. In some embodiments, the reader alternates or cycles through capturing via different imagers of the at least one imager.

In some embodiments, images are continuously captured and processed to determine new illuminators to activate until an image is successfully processed (e.g., a code is successfully detected and decoded). Alternatively or additionally, in some embodiments, the second image or a subsequent image is captured and processed to attempt detecting and decoding of a particular code, and further alternative illuminator combination(s) are determined for activating in circumstances where the second image or a subsequent image is not successfully decoded.

Conclusion

It should be appreciated that the example implementations described herein are each non-limiting examples of various embodiments of the present disclosure. In this regard, one or more enhancements implemented in the various embodiments may be provided in any combination. Additionally or alternatively, in some embodiments, one or more components may be provided with modifications as described herein.

For example, some embodiments may provide for any number of illuminators and/or imagers. In this regard, other embodiments of the present disclosure may include additional optical elements for manipulating the light utilized to produce a particular illumination, and/or for capturing a particular field of view. In this regard, each imager and/or illuminator assembly may include various other components and/or differently configured components from those depicted and described herein. It should be appreciated that the advantages and teachings of the disclosure herein provide significant advantages in such multi-projector apparatuses, for example with respect to maintaining relative alignment of a plurality of fields of views and aimer, and/or illuminating the capturable field(s) of view, while maintaining a relatively small apparatus size.

The embodiments disclosed have been described with certain example configurations and/or implementation details. It should be appreciated that in other embodiments, for example, components may be embodied by other materials known in the art for creating such components and/or structural equivalents. Further, it should be appreciated that embodiments may include any number of known structural elements, or utilize known methodologies, for securing the components and/or sub-components thereof (e.g., for securing one or more LEDs, or other components, to a circuit board or other printed circuit board) without deviating from the scope and spirit of the disclosure.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally or alternatively, in some embodiments, some of the operations above may be modified or further amplified. Furthermore, in some embodiments, additional optional operations may be included. Modifications, amplifications, or additions to the operations above may be performed in any order and in any combination.

Although an example processing system (e.g., a reader processing scanned data) has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus (e.g., a specially configured reader). A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes, in whole or in part, a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). In some embodiments, for example, the reader may capture and transmit data embodying an image representation of a captured field of view to a back-end computing system (e.g., one or more server(s)) for processing.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising:
    a chassis;
    a ring illuminator assembly comprising at least one of at least one polarized illuminator assembly, at least one dark field illuminator assembly, and/or at least one narrow field illuminator assembly;
    a diffuser assembly positioned behind the ring illuminator assembly such that the ring illuminator assembly is positioned at a perimeter of an opening of the diffuser assembly, the diffuser assembly comprising a diffuser and a diffuser back light reflector, wherein the diffuser back light reflector is positioned to direct light from the ring illuminator assembly into the diffuser;
    at least one back light illumination board, the at least one back light illumination board comprising at least one diffuser illuminator aligned with the diffuser back light reflector;
    a lens assembly comprising an aimer lens and at least one imager lens;
    an aimer illuminator associated with the aimer lens; and
    at least one imager board comprising at least one image sensor aligned with the at least one imager lens,
    wherein the chassis houses the ring illuminator assembly, the at least one diffuser illuminator, the at least one back light illumination board, the lens assembly, the aimer illuminator, and the at least one imager board.

2. The apparatus of claim 1, wherein the apparatus comprises a plurality of aimer folding reflectors, wherein the plurality of aimer folding reflectors comprises:
    a first aimer folding reflector positioned in alignment with the aimer illuminator and that folds an aimer illumination towards a viewing axis of the apparatus; and
    a second aimer folding reflector positioned to fold the aimer illumination in a near-coaxial direction associated with a narrow field of view associated with a narrow field sensor of the at least one image sensor and a wide field of view associated with a wide field sensor of the at least one image sensor.

3. The apparatus of claim 1, wherein the diffuser comprises a dome diffuser.

4. The apparatus of claim 1, wherein the lens assembly comprises a single piece lens holder that positions the aimer lens, a narrow field lens, and a wide field lens.

5. The apparatus of claim 1, wherein the lens assembly comprises a single optical lens and at least one polarizer, the at least one polarizer aligned with at least one polarized illuminator of the at least one polarized illuminator assembly.

6. The apparatus of claim 1, wherein the ring illuminator assembly comprises a pair of polarized illuminator assemblies and a pair of narrow field illuminators, each polarized illuminator assembly of the pair of polarized illuminator assemblies positioned at opposite positions across a defined axis.

7. The apparatus of claim 1, wherein the at least one diffuser illuminator is positioned centrally to the ring illuminator assembly.

8. The apparatus of claim 1, the apparatus further comprising a polarizer holder that positions at least one polarizer in front of a ring lens of the ring illuminator assembly aligned with at least one polarized illuminator associated with the at least one polarized illuminator assembly.

9. The apparatus of claim 1, wherein the at least one image sensor comprises a wide field sensor and a narrow field sensor, and wherein the wide field sensor and the narrow field sensor are vertically aligned.

10. The apparatus of claim 1, wherein the at least one image sensor comprises a wide field sensor and a narrow field sensor, and wherein the wide field sensor and the narrow field sensor are horizontally aligned.

11. The apparatus of claim 1, wherein the aimer illuminator is positioned laterally next to a wide field sensor of the at least one image sensor and a narrow field sensor of the at least one image sensor.

12. The apparatus of claim 1, wherein the at least one image sensor comprises a wide field sensor and a narrow field sensor, wherein the aimer illuminator is positioned between the wide field sensor and the narrow field sensor.

13. The apparatus of claim 1, the apparatus further comprising an analyzer positioned at a back of the diffuser.

14. The apparatus of claim 1, the apparatus further comprising a protective window at a back of the diffuser.

15. The apparatus of claim 1, wherein the at least one back light illumination board comprises a single back light illumination board.

16. The apparatus of claim 1, wherein the at least one imager board comprises a single imager board.

17. The apparatus of claim 1, the apparatus further comprising an angled handle.

18. The apparatus of claim 1, wherein the ring illuminator assembly defines a top side, a left side, a right side, and a bottom side, and wherein the ring illuminator assembly comprises:
  a first polarized illuminator assembly positioned in a top-left corner of the top side and the left side, and a second polarized illuminator assembly positioned in a top-right corner of the top side and the right side;
  a first narrow field illuminator positioned in a bottom-left corner of the bottom side and the left side, and a second narrow field illuminator positioned in a bottom-right corner of the bottom side and the right side; and
  a plurality of dark field illuminators, the plurality of dark field illuminators comprising a dark field illuminator positioned along each of the top side, the left side, the bottom side, and the right side.

19. The apparatus of claim 1, wherein the ring illuminator assembly is positioned in front of the at least one diffuser illuminator, wherein the at least one diffuser illuminator is positioned in front of the at least one back light illumination board, wherein the at least one back light illumination board is positioned in front of the lens assembly, and wherein the lens assembly is positioned in front of the at least one imager board.

20. The apparatus of claim 1, the apparatus further comprising at least one processor in communication with the at least one image sensor.

21. A computer-implemented method comprising:
  activating, via a reader, at least one first illuminator of a ring illuminator assembly, the ring illuminator assembly comprising at least one of a polarized illuminator assembly, a diffuser assembly, a narrow field illuminator assembly, and/or a dark field illuminator assembly;
  capturing, via at least one imager, a first image;
  determining a first image effect represented in the first image by processing the first image, wherein the first image effect prevents successful decoding of an indicia;
  determining, based at least in part on the first image effect, a second at least one illuminator to activate, wherein the second at least one illuminator comprises at least one of the polarized illuminator assembly, the diffuser assembly, the narrow field illuminator assembly, and the dark field illuminator assembly, wherein the second at least one illuminator is determined based at least in part on a lookup table that correlates at least the first image effect with the second at least one illuminator to be activated;
  activating the second at least one illuminator; and
  capturing, via the at least one imager, at least a second image.

22. A computer program product comprising at least one non-transitory computer-readable storage medium having computer program code stored thereon, wherein the computer program code in execution with at least one processor configures the computer program product for:
  activating, via a reader, at least one first illuminator of a ring illuminator assembly, the ring illuminator assembly comprising at least one of a polarized illuminator assembly, a diffuser assembly, a narrow field illuminator assembly, and/or a dark field illuminator assembly;
  capturing, via at least one imager, a first image;
  determining a first image effect represented in the first image by processing the first image, wherein the first image effect prevents successful decoding of an indicia;
  determining, based at least in part on the first image effect, a second at least one illuminator to activate, wherein the second at least one illuminator comprises at least one of the polarized illuminator assembly, the diffuser assembly, the narrow field illuminator assembly, and the dark field illuminator assembly, wherein the second at least one illuminator is determined based at least in part on a lookup table that correlates the first image effect with the second at least one illuminator to be activated;
  activating the second at least one illuminator; and
  capturing, via the at least one imager, at least a second image.

* * * * *